(12) United States Patent
Van Doren et al.

(10) Patent No.: US 7,620,696 B2
(45) Date of Patent: *Nov. 17, 2009

(54) SYSTEM AND METHOD FOR CONFLICT RESPONSES IN A CACHE COHERENCY PROTOCOL

(75) Inventors: Stephen R. Van Doren, Northborough, MA (US); Gregory Edward Tierney, Chelmsford, MA (US); Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

This patent is subject to a terminal disclaimer.

(21) Appl. No.: 10/761,047

(22) Filed: Jan. 20, 2004

(65) Prior Publication Data

US 2005/0198192 A1 Sep. 8, 2005

(51) Int. Cl.
*G06F 15/16* (2006.01)

(52) U.S. Cl. .................. 709/217; 709/213; 709/214; 709/223; 709/224; 709/203; 709/226; 709/232; 711/141; 711/146; 711/147; 711/148; 711/152; 711/155

(58) Field of Classification Search .............. 709/225, 709/226, 229, 223, 224, 203, 232, 217, 213, 709/214; 711/141, 146, 147, 148, 152, 155
See application file for complete search history.

(56) References Cited

U.S. PATENT DOCUMENTS

| | | | |
|---|---|---|---|
| 5,301,298 A | 4/1994 | Kagan | |
| 5,489,791 A | 2/1996 | Arima | |
| 5,535,116 A * | 7/1996 | Gupta et al. | ........ 700/5 |
| 5,706,463 A | 1/1998 | Ebrahim | |
| 5,802,577 A | 9/1998 | Bhat et al. | |
| 5,829,040 A | 10/1998 | Son | |
| 5,875,467 A | 2/1999 | Merchant | |
| 5,875,472 A | 2/1999 | Bauman et al. | |
| 5,893,922 A | 4/1999 | Baylor | |
| 5,945,710 A | 8/1999 | Oda | |
| 5,958,019 A | 9/1999 | Hagersten et al. | |
| 5,987,571 A | 11/1999 | Shibata | |
| 6,049,851 A | 4/2000 | Bryg | |
| 6,055,605 A | 4/2000 | Sharma et al. | |

(Continued)

FOREIGN PATENT DOCUMENTS

JP 10-189951 7/1998

(Continued)

OTHER PUBLICATIONS

Rajeev, Joshi, et al., "Checking Cache-Coherence Protocols with TLA+", Kluwer Academic Publishers, 2003, pp. 1-8.

(Continued)

*Primary Examiner*—Ario Etienne
*Assistant Examiner*—Barbara N Burgess

(57) ABSTRACT

A system comprises a first node that provides a broadcast request for data. The first node receives a read conflict response to the broadcast request from the first node. The read conflict response indicates that a second node has a pending broadcast read request for the data. A third node provides the requested data to the first node in response to the broadcast request from the first node. The first node fills the data provided by the third node in a cache associated with the first node.

36 Claims, 7 Drawing Sheets

U.S. PATENT DOCUMENTS

| | | | |
|---|---|---|---|
| 6,085,263 | A | 7/2000 | Sharma et al. |
| 6,108,737 | A | 8/2000 | Sharma et al. |
| 6,128,677 | A | 10/2000 | Miller |
| 6,138,218 | A | 10/2000 | Arimilli |
| 6,245,603 | B1 | 6/2001 | Shinohara |
| 6,272,602 | B1 | 8/2001 | Singhal |
| 6,345,342 | B1 | 2/2002 | Arimilli et al. |
| 6,351,784 | B1 | 2/2002 | Neal |
| 6,457,100 | B1 | 9/2002 | Ignatowski et al. |
| 6,467,012 | B1 | 10/2002 | Alvarez |
| 6,484,240 | B1 | 11/2002 | Cypher |
| 6,490,661 | B1 | 12/2002 | Keller et al. |
| 6,529,990 | B1 | 3/2003 | Kruse |
| 6,615,319 | B2 | 9/2003 | Khare |
| 6,631,401 | B1 | 10/2003 | Keller et al. |
| 6,631,448 | B2 | 10/2003 | Weber |
| 6,633,960 | B1 | 10/2003 | Kessler |
| 6,654,858 | B1 | 11/2003 | Asher |
| 6,696,729 | B2 | 2/2004 | Adachi |
| 6,711,653 | B1 | 3/2004 | Hammond |
| 6,745,272 | B2 | 6/2004 | Owen |
| 6,751,721 | B1 | 6/2004 | Webb |
| 6,877,056 | B2 * | 4/2005 | Cypher ................. 710/244 |
| 6,883,070 | B2 * | 4/2005 | Martin et al. ............ 711/141 |
| 6,922,756 | B2 | 7/2005 | Hum |
| 6,931,496 | B2 | 8/2005 | Chen |
| 6,993,631 | B2 | 1/2006 | Rowlands |
| 7,032,079 | B1 * | 4/2006 | Bauman et al. ........... 711/141 |
| 7,143,245 | B2 | 11/2006 | Tierney |
| 7,149,852 | B2 | 12/2006 | Van Doren |
| 7,171,521 | B2 | 1/2007 | Rowlands |
| 7,176,097 | B2 | 2/2007 | Hiraizumi |
| 7,222,220 | B2 | 5/2007 | Cypher |
| 7,395,374 | B2 | 7/2008 | Tierney |
| 2001/0034815 | A1 | 10/2001 | Dungan et al. |
| 2002/0009095 | A1 | 1/2002 | Van Doren et al. |
| 2002/0073071 | A1 | 6/2002 | Pong et al. |
| 2002/0129211 | A1 * | 9/2002 | Arimilli et al. ............ 711/146 |
| 2003/0018739 | A1 | 1/2003 | Cypher et al. |
| 2003/0140200 | A1 | 7/2003 | Jamil et al. |
| 2003/0145136 | A1 | 7/2003 | Tierney et al. |
| 2003/0195939 | A1 | 10/2003 | Edirisooriya et al. |
| 2003/0200397 | A1 | 10/2003 | McAllister et al. |
| 2003/0217236 | A1 | 11/2003 | Rowlands |
| 2004/0002992 | A1 | 1/2004 | Cypher |
| 2004/0068624 | A1 | 4/2004 | Van Doren |
| 2004/0123047 | A1 | 6/2004 | Hum |
| 2004/0123052 | A1 | 6/2004 | Beers |
| 2004/0181636 | A1 | 9/2004 | Martin |
| 2005/0013294 | A1 | 1/2005 | Cypher |
| 2005/0053057 | A1 | 3/2005 | Deneroff |
| 2005/0060502 | A1 | 3/2005 | Tan |
| 2005/0160238 | A1 * | 7/2005 | Steely et al. ............. 711/145 |
| 2005/0251626 | A1 | 11/2005 | Glasco |
| 2005/0251631 | A1 | 11/2005 | Rowlands |

FOREIGN PATENT DOCUMENTS

| | | |
|---|---|---|
| JP | 2000-232075 | 8/2000 |
| JP | 2003-017578 | 1/2003 |

OTHER PUBLICATIONS

Martin, Milo M.K., et al., "Token Coherence: Decoupling Performance and Correctness", ISCA-30, pp. 1-12, Jun. 9-11, 2003.

Acacio, Manuel E., et al., "Ow ner Prediction for Accelerating Cache-to-Cache Transfer Misses in a cc-NUMA Architecture", IEEE 2002.

Gharachorloo, Kourosh, et al., "Architecture and Design of AlphaServer GS320", Western Research Laboratory, (Date Unknown).

Gharachorloo, Kourosh, et al., "Memory Consistency and Event Ordering In Scalable Shared-Memory Multiprocessors", Computer Systems Laboratory, pp. 1-14, (Date Unknown).

Notice of Allowance dated Jun. 28, 2006 for U.S. Appl. No. 10/761,044 in the United States.

Final Office Action dated Mar. 21, 2007 for U.S. Appl. No. 10/760,599 in the United States.

Non-Final Office Action dated Oct. 6, 2006 for U.S. Appl. No. 10/760,599 in the United States.

Non-Final Office Action dated Apr. 19, 2006 for U.S. Appl. No. 10/760,599 in the United States.

Final Office Action dated Apr. 18, 2007 for U.S. Appl. No. 10/760,640 in the United States.

Non-Final Office Action dated Oct. 10, 2006 for U.S. Appl. No. 10/760,640 in the United States.

Non-Final Office Action dated Apr. 19, 2006 for U.S. Appl. No. 10/760,640 in the United States.

Final Office Action dated Dec. 4, 2006 for U.S. Appl. No. 10/760,813 in the United States.

Non-Final Office Action dated Jun. 29, 2006 for U.S. Appl. No. 10/760,813 in the United States.

Final Office Action dated May 14, 2009 for U.S. Appl. No. 10/761,048 in the United States.

Non-Final Office Action dated Sep. 17, 2008 for U.S. Appl. No.10/761,048 in the United States.

Final Office Action dated Mar. 13, 2007 for U.S. Appl. No.10/760,652 in the United States.

Non-Final Office Action dated Jul. 25, 2006 for U.S. Appl. No.10/760,652 in the United States.

Notice of Allowance dated Feb. 28, 2008 for U.S. Appl. No. 10/760,651 in the United States.

Non-Final Office Action dated Sep. 7, 2007 for U.S. Appl. No. 10/760,651 in the United States.

Non-Final Office Action dated Mar. 28, 2007 for U.S. Appl. No. 10/760,651 in the United States.

Non-Final Office Action dated Oct. 18, 2006 for U.S. Appl. No. 10/760,651 in the United States.

Non-Final Office Action dated May 19, 2006 for U.S. Appl. No. 10/760,651 in the United States.

Non-Final Office Action dated Dec. 19, 2005 for U.S. Appl. No. 10/760,651 in the United States.

Notice of Allowance dated Jun. 29, 2006 for U.S. Appl. No. 10/761,034 in the United States.

Final Office Action dated Apr. 20, 2007 for U.S. Appl. No. 10/760,659 in the United States.

Non-Final Office Acton dated Nov. 17, 2006 for U.S. Appl. No. 10/760,659 in the United States.

Non-Final Office Acton dated May 23, 2006 for U.S. Appl. No. 10/760,659 in the United States.

Final Office Acton dated Mar. 29, 2007 for U.S. Appl. No. 10/761,073 in the United States.

Non-Final Office Acton dated Oct. 6, 2006 for U.S. Appl. No. 10/761,073 in the United States.

Notice of Allowance dated Sep. 27, 2006 for U.S. Appl. No. 10/760,463 in the United States.

Non-Final Office Action dated Mar. 31, 2006 for U.S. Appl. No. 10/760,463 in the United States.

Final Office Action dated Nov. 4, 2005 for U.S. Appl. No. 10/760,463 in the United States.

Non-Final Office Action dated Feb. 25, 2005 for U.S. Appl. No. 10/760,463 in the United States.

Non-Final Office Action dated Sep. 22, 2004 for U.S. Appl. No. 10/760,463 in the United States.

Notice of Allowance dated Jun. 2, 2009 for U.S. Appl. No. 10/761,047 in the United States.

Final Office Action dated Feb. 4, 2009 for U.S. Appl. No. 10/761,047 in the United States.

Non-Final Office Action dated Aug. 20, 2008 for U.S. Appl. No. 10/761,047 in the United States.

Non-Final Office Action dated Mar. 6, 2008 for U.S. Appl. No. 10/761,047 in the United States.

Non-Final Office Action dated Sep. 20, 2007 for U.S. Appl. No. 10/761,047 in the United States.

Final Office Action dated Jun. 14, 2007 for U.S. Appl. No. 10/761,047 in the United States.

Non-Final Office Action dated Dec. 18, 2006 for U.S. Appl. No. 10/761,047 in the United States.

Non-Final Office Action dated Jun. 15, 2006 for Serial No. 10/761,047 in the United States.

Scheurich et al., "The Design of a Lockup-free Cache For High-Performance Multiprocessors", Nov. 14-18, 1988 Supercomputing '88 (vol. 1) Proceedings pp. 352-359.

Laudon et al., "The SGI Orgin: A ccNUMA Highly Scalable Server", 1997 International Conference on Computer Architecture, pp. 241-251.

Martin, Milo M.K., et al., "Token Coherence: Decoupling Performance And Correctness", ISCH-30, pp. 1-12, Jun. 9-11, 2003.

Rajeev, Joshi et al., "Checking Cache-Coherence Protocols With TLA+", Kluwer Adacemic Publishers, 2003, pp. 1-8.

Handy, "The Cache Memory Book", 1998, Academic Press second edition, pp. 144-155.

Chen et al., "Write Caching in Distributed Filed Systems", Distributed Computing Systems, 1995., Proceedings Of The 15th Int'l Con., May 30-Jun. 2, 1995, pp. 457-466.

Archibald et al., "Cache Coherence Portocols: Evaluation Using A Mulitprocessor Simulation Model", Nov. 1986, ACM Transactions on Computer Systems, pp. 273-298.

Gharachorloo, Kourosh et al., "Architecture and Design of AlphaServer GS320", Western Research Laboratory, (Date Unknown).

Gharachorloo, Kourosh et al., "Memory Consistency And Event Ordering In Scalable Shared-Memory Multiprocessors", Computer Systems Laboratory, pp. 1-14(Date Unknown).

Martin et al., "Band width Adaptive Snooping", Proceedings of the Eighth International Symposium on High-Performance Computer Architecture (HPCA'02), 2002 IEEE.

Acacio, Manuel et al., "Owner Prediction for Accelerating Cache-to-Cache Transfer Misses in a cc-NUMA Architecture", IEEE 2002.

Examiner's Answer dated Jan. 31, 2008 for U.S. Appl. No. 10/760,599 in the United States.

Examiner's Answer dated Aug. 22, 2008 for U.S. Appl. No. 10/760,640 in the United States.

Examiner's Answer dated Jun. 17, 2008 for U.S. Appl. No. 10/760,813 in the United States.

Examiner's Answer dated Jun. 10, 2008 for U.S. Appl. No. 10/760,652 in the United States.

Examiner's Answer dated Feb. 8, 2008 for U.S. Appl. No. 10/760,659 in the United States.

Examiner's Answer dated Mar. 13, 2008 for U.S. Appl. No. 10/761,073 in the United States.

Examiner's Interview Summery dated Jan. 28, 2008 for U.S. Appl. No. 10/760,651 in the United States.

* cited by examiner

SYSTEM AND METHOD FOR CONFLICT RESPONSES IN A CACHE COHERENCY PROTOCOL

RELATED APPLICATIONS

This application is related to the following commonly assigned co-pending patent applications entitled: "CACHE COHERENCY PROTOCOL WITH ORDERING POINTS," application Ser. No. 10/760,640; "SYSTEM AND METHOD FOR RESOLVING TRANSACTIONS IN A CACHE COHERENCY PROTOCOL," application Ser. No. 10/760,813; "SYSTEM AND METHOD TO FACILITATE ORDERING POINT MIGRATION," application Ser. No. 10/761,048; "SYSTEM AND METHOD TO FACILITATE ORDERING POINT MIGRATION TO MEMORY," application Ser. No. 10/760,599; "SYSTEM AND METHOD FOR CREATING ORDERING POINTS," application Ser. No. 10/760,652; "SYSTEM AND METHOD FOR CONFLICT RESPONSES IN A CACHE COHERENCY PROTOCOL WITH ORDERING POINT MIGRATION," application Ser. No. 10/760,651, which issued as U.S. Pat. No. 7,359,374 on Jun. 11, 2008; "SYSTEM AND METHOD FOR READ MIGRATORY OPTIMIZATION IN A CACHE COHERENCY PROTOCOL," application Ser. No. 10/761,044, which issued as U.S. Pat. No. 7,143,245 on Nov. 28, 2006; "SYSTEM AND METHOD FOR BLOCKING DATA RESPONSES," application Ser. No. 10/761,034, which issued as U.S. Pat. No. 7,149,852 on Dec. 12, 2006; "SYSTEM AND METHOD FOR NON-MIGRATORY REQUESTS IN A CACHE COHERENCY PROTOCOL," application Ser. No. 10/760,659; "SYSTEM AND METHOD FOR CONFLICT RESPONSES IN A CACHE COHERENCY PROTOCOL WITH ORDERING POINT MIGRATION," application Ser. No. 10/761,073; "SYSTEM AND METHOD FOR RESPONSES BETWEEN DIFFERENT CACHE COHERENCY PROTOCOLS," application Ser. No. 10/760,436, which issued as U.S. Pat. No. 7,177,987 on Feb. 13, 2007, all of which are filed contemporaneously herewith on Jan. 20, 2004, and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable fast access to data. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location, the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches monitors (or snoops) requests to the system. The other caches respond by indicating whether a copy of the requested data is stored in the respective caches. Thus, correct ownership and usage of the data are determined by the collective responses to the snoops.

SUMMARY

One embodiment of the present invention may comprise a system that includes a first node that provides a broadcast request for data. The first node receives a read conflict response to the broadcast request from the first node. The read conflict response indicates that a second node has a pending broadcast read request for the data. A third node provides the requested data to the first node in response to the broadcast request from the first node. The first node fills the data provided by the third node in a cache associated with the first node.

Another embodiment of the present invention may comprise a multi-processor network that includes a first processor node operative to issue a first source broadcast request for data. A second processor node is operative to issue a second source broadcast request for the data. A third node is operative to provide a data response in response to the respective source broadcast requests of the first and second processor nodes. The third node is one of an owner processor node and a memory node. The second processor node is operative to provide a read conflict response to the first source broadcast request when the second source broadcast request is a read request. The second processor node is operative to provide a second conflict response to the first source broadcast request when the second source broadcast request is a write request. The first processor node is operative in response to receiving a read conflict response from the second processor to implement a cache fill with the data provided by the third node.

Another embodiment of the present invention may comprise a computer system that includes a first processor operative to issue a source broadcast request for data. A second processor is operative to issue a source broadcast request for the data. A node is operative to provide a data response to both the first and second processors in response to the source broadcast requests of the first and second processors. The second processor in response to the source broadcast request of the first processor provides a read conflict response when the source broadcast request of the second processor is a source broadcast read request. The second processor in response to the source broadcast request of the first processor provides a second conflict response when the source broadcast request of the second processor is a source broadcast write request. The first processor in response to the read conflict response of the second processor is operative to fill the data provided by the third node in a cache associated with the first processor.

Yet another embodiment of the present invention may comprise a method that includes providing a source broadcast request from a first node for data. The method also includes providing a read conflict response to the first node from a second node in response to the source broadcast request from the first node, the read conflict response indicating that the second node has a pending broadcast read request for the data. The method also includes providing the requested data to the first node from a third node in response to the source broadcast request from the first node. The method further includes placing the data provided by the third node in a cache associated with the first node.

Still another embodiment of the present invention may comprise a computer system that includes a hybrid cache coherency protocol that employs source broadcast protocol mode and a forward progress protocol mode. The computer system is operative to fill a cache line associated with a source node with requested data provided in response to a source broadcast protocol mode request for the data when there is a source broadcast protocol read conflict with another node in the computer system. The computer system is further operative to reissue a request for the data from a source node using a forward progress protocol mode request for the data when there is a source broadcast protocol second conflict with another node in the computer system.

DETAILED DESCRIPTION

This disclosure relates generally to a hybrid cache coherency protocol, such as a broadcast source snoop protocol (SSP) implemented in conjunction with a forward progress (e.g., directory-based or null-directory) protocol (FPP). Characteristic of the hybrid cache coherency protocol, requests for data are initially transmitted broadcast using SSP broadcast snoop requests. If the snoop requests fail or otherwise cannot be completed, such as where there is a conflict between multiple processors attempting to read and/or write the same cache line, the protocol can transition to the FPP mode and the requests can be reissued using FPP request commands. Other forward progress techniques could also be utilized.

The cache coherency protocol employs conflict states that are assigned to a miss address file (MAF) entry for an outstanding broadcast snoop request. The conflict states are used to determine how to handle conflicts that arise in broadcast snoop request transactions. The conflict states include a read conflict (RD-CONF) state and a conflict (CONFLICT) state. In general, the RD-CONF state is assigned to a MAF entry in a conflict scenario in which the broadcast snoop requests that conflict with the MAF entry are broadcast read snoop requests. In general, the CONFLICT state is assigned to a MAF entry in a conflict scenario in which the broadcast snoop requests that conflict with the MAF entry include broadcast write snoop requests.

The implementation of the CONFLICT and RD-CONF states is useful in multi-processor systems employing a hybrid cache coherency protocol, such as the SSP/FPP hybrid cache coherency protocol described herein. In a conflict scenario in which a source processor receives a data response and a RD-CONF response to a broadcast snoop request for data, the source processor can place the data in a cache associated with the source processor. In a conflict scenario in which a source processor receives a data response and a CONFLICT response to a broadcast snoop request for data, the source processor can employ a forward progress technique to complete the transaction. For example, the source processor can transition to a forward progress protocol (FPP) mode and reissue the request for the data using FPP request commands. The cache coherency protocol disclosed herein thus mitigates having to transition to the FPP mode in certain conflict scenarios, which can help reduce latency.

Figure 1:
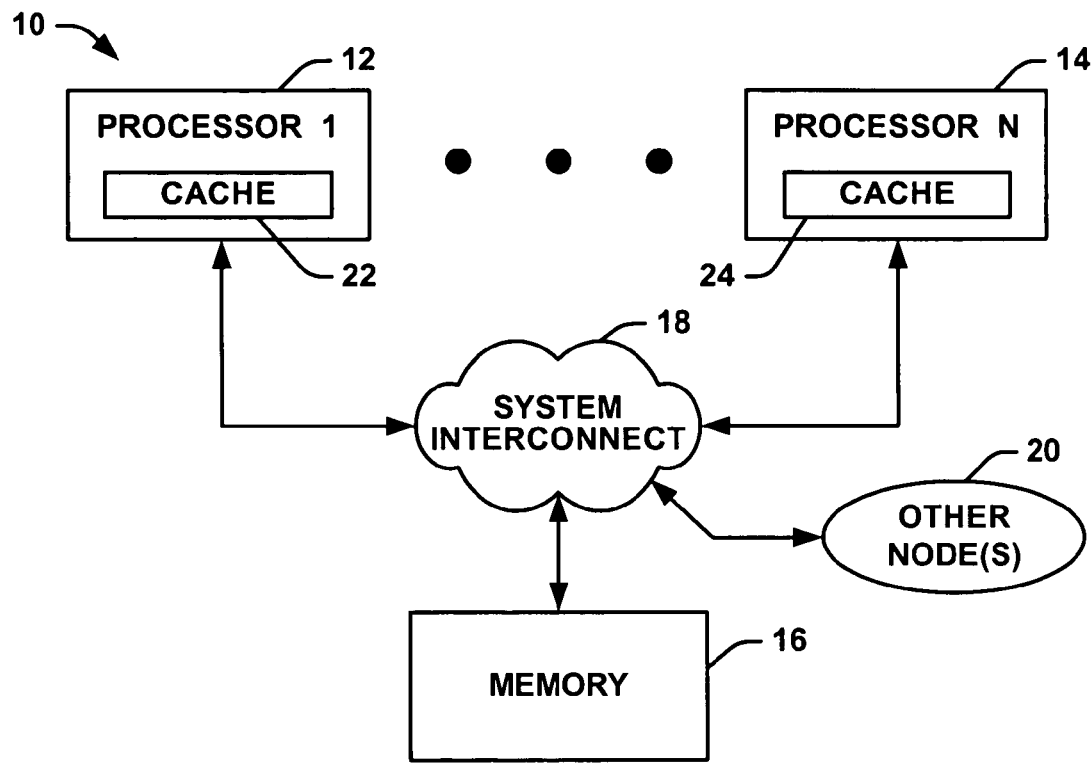
FIG. 1 depicts an example of a multi-processor system.

FIG. 1 depicts an example of a system 10 in which a cache coherency protocol of the present invention may be implemented. The system 10 illustrates a multi-processor environment that includes a plurality of processors 12 and 14 (indicated at PROCESSOR 1 through PROCESSOR N, where N is a positive integer (N>1)). The system 10 also includes memory 16 that provides a shared address space. For example, the memory 16 can include one or more memory storage devices (e.g., dynamic random access memory (DRAM)).

The processors 12 and 14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12 and 14 includes at least one corresponding cache 22 and 24. For purposes of brevity, each of the respective caches 22 and 24 is depicted as unitary memory devices, although the caches may include a plurality of memory devices or different cache levels. Each of the caches 22 and 24 includes a plurality of cache lines. Each cache line has an associated tag address that identifies corresponding data stored in the line. The cache lines can also include information identifying the state of the data for the respective lines.

The system 10 thus employs the caches 22 and 24 and the memory 16 to store blocks of data, referred to herein as "memory blocks." A memory block can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

Each cache line can also include information identifying the state of the data stored in the respective cache. A given memory block can be stored in a cache line of one or more of the caches 22 and 24 as well as in a memory line of the memory 16, depending on the state of the line. Whether a cache line contains a coherent copy of the data also depends on the state of the cache line. Certain states employed by the coherency protocol can define a given cache line as an ordering point for the system 10 employing a broadcast-based protocol. An ordering point characterizes a serialization of requests to the same memory line (or memory block) that is understood and followed by the system 10.

The system 10 implements the cache coherency protocol described herein to manage the sharing of memory blocks so as to help ensure coherence of data. The cache coherency protocol of the system 10 utilizes a plurality of states to identify the state of each memory block stored in respective cache lines of the caches 22 and 24 and the memory 16. The coherency protocol establishes rules for transitioning between states, such as if data is read from or written to memory 16 or one of the caches 22 and 24.

As used herein, a node that issues a request, such as a read or write request, defines a source node. Other nodes within the system 10 are potential targets of the request. Additionally, each memory block in the system 10 can be assigned a home node that maintains necessary global information and a data value for that memory block. When a source node issues a source broadcast snoop request for data, an entry associated with the request is allocated in a miss address file (MAF). The MAF maintains information associated with, for example, the tag address of the data being requested, the type of request, and response information received from other nodes in response to the request. The MAF entry for the request is maintained until the request associated with the MAF is complete.

For example, when a source node, such as the processor 12, requires a copy of a given memory block, the source node typically first requests the memory block from its local, private cache by identifying the tag address associated with the memory block. If the data is found locally, the memory access is resolved without communication via the system interconnect 18. When the requested memory block is not found locally, the source node 12 can request the memory block from the system 10, including the memory 16. In addition to the request identifying a tag address associated with the requested memory block, the request usually identifies the type of request or command being issued by the requester. Whether the other nodes 14 and the memory 16 will return a response depends upon the type of request, as well as the state of the identified memory block contained in the responding nodes. The cache coherency protocol implemented by the system 10 defines the available states and possible state transitions.

A set of cache states that can be included in the cache coherency protocol described herein is depicted below in Table 1. Each cache line of the respective caches 22 and 24 of the processors 12 and 14 may be associated or tagged with one of the cache states in table 1. Since there are eight possible states, the state information can be encoded by a three-bit data word, for example.

TABLE 1

| STATE | DESCRIPTION |
| --- | --- |
| I | Invalid—The cache line does not exist. |
| S | Shared—The cache line is valid and unmodified by caching processor. Other processors may have valid copies, and the caching processor cannot respond to snoops by returning data. |

TABLE 1-continued

| STATE | DESCRIPTION |
| --- | --- |
| E | Exclusive—The cache line is valid and unmodified by caching processor. The caching processor has the only cached copy in the system and may respond to snoops by returning data. |
| F | First (among equals)—The cache line is valid and unmodified by caching processor. Other processors may have valid copies, and caching processor may respond to snoops by returning data. |
| D | Dirty—The cache line is valid and more up-to-date than memory. The cache line has not been modified by the caching processor, and the caching processor has the only cached copy in the system. The caching processor must respond to snoops by returning data and must write data back to memory upon displacement. The dirty state permits a modified block to be transferred between caches without updating memory. |
| M | Modified—The cache line is valid and has been modified by the caching processor. The caching processor has the only cached copy in the system, and the caching processor must respond to snoops by returning data and must write data back to memory upon displacement. |
| O | Owned—The cache line is valid and more up-to-date than memory. The caching processor cannot modify the cache line. Other processors may have valid copies, and the caching processor must respond to snoops by returning data and must write data back to memory upon displacement. |
| T | Transition—The cache line is in transition. The cache line may be transitioning from O, M, E, F or D to I, or the line may be transitioning from I to any one of the valid states. |

As mentioned above, the state of a cache line can be utilized to define a cache ordering point in the system 10. In particular, for a protocol implementing the states set forth in Table 1, a processor including a cache line having one of the states M, O, E, F or D may be referred to as an owner processor or node. The owner node can serve as a cache ordering point for the data contained in the cache line for transactions in the broadcast-based protocol. An owner processor (e.g., processor 12 or 14) that serves as the cache ordering point is capable of responding with data to snoops for the data. For example, processor 14 may be an owner processor for particular data and thus can provide a copy of the data to another cache 12. The type of data returned by an owner processor depends on the state of the data stored in the processor's cache. The response may also vary based on the type of request as well as whether a conflict exists. The memory 16 seeks to return a copy of the data stored in the memory. The memory copy of the data is not always a coherent copy and may be stale (e.g., when there is a modified copy of the data cached by another processor).

The cache coherency protocol described herein can provide for ordering point migration in which a cache ordering point is transferred from a target node to a source processor in response to a source broadcast read request. For example, a target node (e.g., processor 14) including an M-state cache line can, in response to a source broadcast read request, provide an ownership data response to a source node (e.g., processor 12), and the source node cache line transitions to the D-state. To mitigate the vulnerability of the ordering point during migration, the cache line of the target processor 14 can transition to the T-state while the ordering point migration is pending. Upon completion of the ordering point transfer, the target processor 14 cache line can transition from the T-state to the I-state. The ordering point is thus transferred (i.e., the ordering point migrates) from the target processor 14 to the source processor 12.

Additionally, the source processor 12 can provide a message that acknowledges when the ordering point has successfully migrated (e.g., a migration acknowledgement or "MACK" message). The cache line of the target processor 14 can further transition from the T-state to the I-state in response to receiving the MACK message from the source processor 12. The target processor 14 can respond to the MACK message by providing a further acknowledgement message back to the source processor 12 (e.g., a MACK acknowledgement or MACK-ACK message). The source broadcast read request by the source processor 12 that initiated the migration sequence can be considered completed in response to receiving the MACK-ACK message from the target processor 14.

The processors 12 and 14 of the system 10 can obtain copies of desired data by issuing data requests in either the SSP or FPP portion of the cache coherency protocol implemented in the system. A list of example data requests that can be included in the SSP portion of the cache coherency protocol described herein, and thus issued through a source broadcast request by a processor (e.g., processors 12 and 14), is depicted below in Table 2.

TABLE 2

| Request Type | Request | Request Description |
|---|---|---|
| Reads | XREADN | Broadcast read line code: Non-migratory read request. |
| | XREADM | Broadcast read line data: Migratory read request. |
| | XREADC | Broadcast read current (non-coherent read). |
| Writes | XRDINVAL | Broadcast read and invalidate line with owner. |
| | XUPGRADE | Broadcast invalidate line—upgrade un-writable copy. |
| Memory Updates | XWRITE | Broadcast memory write-back—victim write. |
| | XUPDATE | Broadcast memory update—victim write. |
| | XWRITEC | Broadcast write coherent. |
| Special Commands | MACK | Broadcast migration acknowledgment. |
| | XINVAL | Broadcast invalidate. |

According to the cache coherency protocol described herein, source processors 12 and 14 issue data requests initially as broadcast snoop requests using the SSP commands set forth in Table 2. If the snoop requests fail and a transition to the FPP is required (e.g., due to a conflict), the system 10 can transition to FPP mode and the requests can be reissued using FPP commands.

Whenever a broadcast read or write snoop is issued by a source node (e.g., source processor 12) in the system 10, target nodes of the system (e.g., target processor 14, memory 16, and nodes 20) may issue an SSP response to the snoop. A list of example SSP responses that may be included in the cache coherency protocol described herein is depicted below in Table 3.

TABLE 3

| SSP Broadcast Response (SSP) | Response Description |
|---|---|
| D-DATA | Ownership data response—Corresponding snoop command was the first to arrive at a cached ordering point (M, O, D, E, F state); the ordering point is being transferred to the requesting processor. At most, one D-DATA command can exist per cache line at any given time. |
| S-DATA | Shared data response—Data is being returned from a cached ordering point; the ordering point is not being transferred. |

TABLE 3-continued

| SSP Broadcast Response (SSP) | Response Description |
|---|---|
| M-DATA | Memory data response—Data is being returned from home memory. |
| MISS | General snoop response: Snoop failed to match a cache or MAF entry at a snoop target. Snoop matched at a snoop target and invalidated a cache line at the target. Acknowledgement for broadcast invalidate line requests. Acknowledgement for broadcast migration acknowledgement requests. Acknowledgement for broadcast victim write requests. |
| SHARED | Snoop hit shared—Read snoop matched on a cache line in the S-state. |
| CONFLICT | Snoop conflict—Snoop matched a valid write MAF (read or write) or T-state cache line at a target processor. |
| RD-CONF | Snoop read conflict—A special case conflict where a snoop matched a valid read MAF. |
| FPP | Snoop hit FPP-Mode MAF—Some other processor is trying to access the same cache line and has already transitioned to the forward progress protocol (FPP) mode. This response is required for forward progress/starvation avoidance. |

A target node can provide an ownership data response that includes D-DATA, for example, when the processor has an ownership state (e.g., M, O, E, F or D) associated with the cached data in the SSP protocol. It is the state of the cached data that defines the node (processor) as a cache ordering point for the data. When a processor responds with D-DATA, the ordering point is transferred to the requesting processor. S-DATA is a shared data response that indicates data is being returned from a cached ordering point, although the ordering point itself is not being transferred to the requester. An S-DATA response also indicates that a copy of the data may be in one or more other caches. An M-DATA response can be provided by memory (e.g., a home node) by returning the present value for the data stored in memory. It is possible that the M-DATA is stale and not up-to-date.

Figure 2:
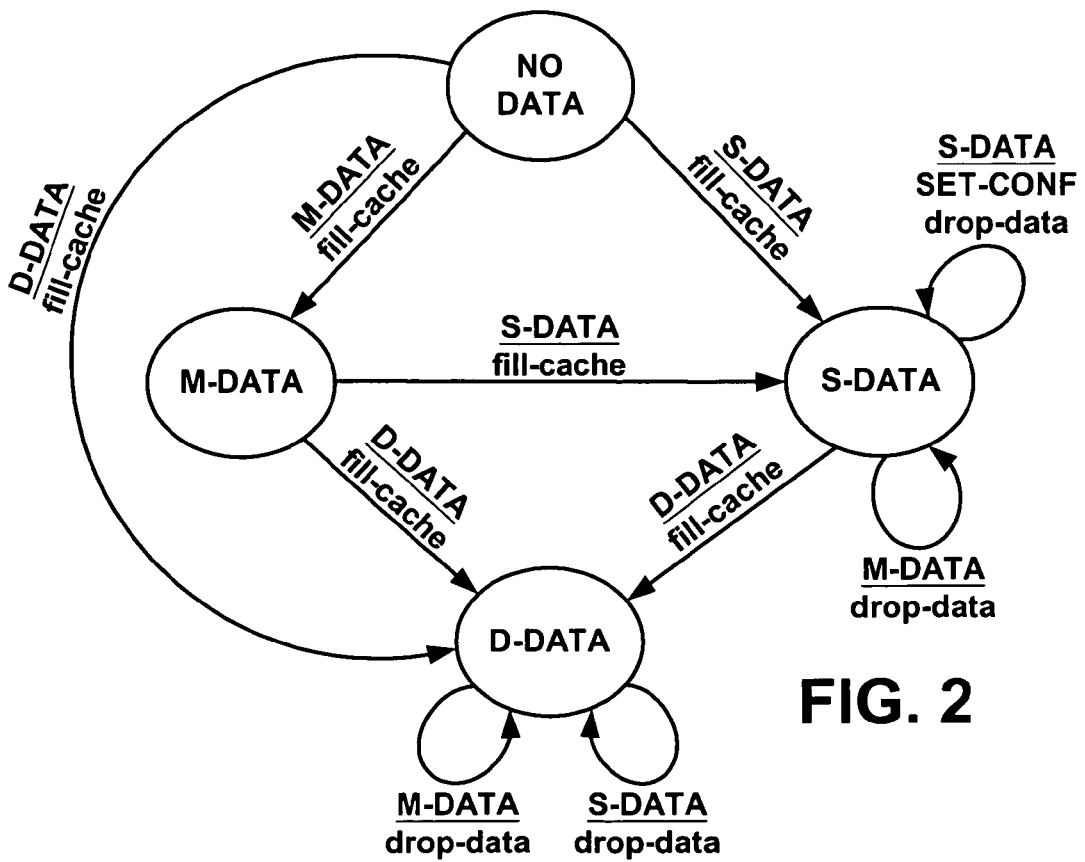
FIG. 2 depicts an example of a data state flow diagram that may be implemented in a coherency protocol.

When a source node (e.g., source processor 12) issues a source broadcast request for data, each of the target nodes (e.g., target processor 14, memory 16, and nodes 20) may provide a data response. In the cache coherency protocol described herein, there are three different types of data responses: shared data responses (S-DATA), dirty data responses (D-DATA), and memory data responses (M-DATA). It is thus possible that, in response to a source broadcast request for data, the source processor 12 can receive several different data responses. Accordingly, the source processor 12 requester can employ a data state machine associated with the MAF entry for the source broadcast request to manage filling data in the cache of the source processor. FIG. 2 depicts an example of a data state diagram that represents operation of a data state machine that can be utilized to manage data responses returned to a source node in the SSP protocol. The example data state diagram of FIG. 2 implements the data responses set forth in Table 3.

As shown in the data state diagram of FIG. 2, D-DATA overrides both M-DATA and S-DATA, meaning that D-DATA will result in a cache fill, overwriting M-DATA or S-DATA that is received prior to the D-DATA. Additionally, S-DATA will overwrite M-DATA, but not D-DATA. Thus, D-DATA has priority over M-DATA and S-DATA, and S-DATA has priority over M-DATA. M-DATA results in a cache fill only if no other types of data have been received. If a lower priority data is received at a requester, the requester can drop the subsequent, lower priority data. Also, as shown in FIG. 2, if multiple S-DATA responses are received, a SET-CONF condition exists and a CONFLICT message is provided to the conflict state machine associated with the MAF.

Examples of processor snoop responses to source broadcast snoop requests that can occur in the system 10 and the target node transitions that result therefrom are provided in Table 4. The state transitions set forth in Table 4 assume that no conflicts are encountered in response to the respective commands. Conflict conditions can affect state transitions, as described herein. As shown in Table 4, the response to the source node varies depending on the type of broadcast snoop request received at the target node and the cache state of the target node when the snoop request is received.

TABLE 4

| Source Node Request Type | Source Node Request | Target Node Cache State | Target Node Next Cache State | Response to Source Node |
|---|---|---|---|---|
| Reads | XREADN | T | Unchanged | Conflict |
| | XREADN | I | Unchanged | MISS |
| | XREADN | S | Unchanged | Shared |
| | XREADN | E, F | F | S-DATA |
| | XREADN | M, D, O | O | S-DATA |
| | XREADM | T | Unchanged | Conflict |
| | XREADM | I | Unchanged | MISS |
| | XREADM | S | Unchanged | Shared |
| | XREADM | E, F | F | S-DATA |
| | XREADM | D, O | O | S-DATA |
| | XREADM | M | T | D-DATA |
| | XREADC | T | Unchanged | Conflict |
| | XREADC | S, I | Unchanged | MISS |
| | XREADC | M, D, O, E, F | Unchanged | S-DATA |
| Writes | XRDINVAL | T | Unchanged | Conflict |
| | XRDINVAL | S, I | I | MISS |
| | XRDINVAL | M, D, O, E, F | T | D-DATA |
| | XUPGRADE | S, I | I | MISS |
| | XUPGRADE | M, D, O, E, F, T | | Error—XUPGRADE should not find an owner or T-state target node. |
| Memory Updates | XWRITE | S, I | Unchanged | MISS |
| | XWRITE | M, D, O, E, F, T | | Error—XWRITE should not find an owner or T-state target node. |
| Special Commands | MACK | T | I | MISS |
| | MACK | M, D, O, E, F, S, I | | Error—MACK should always find a T-state target node. |
| | XINVAL | T, I | Unchanged | MISS |
| | XINVAL | M, D, O, E, F, S | | Error—XINVAL should not find an owner or S-state target node. |

Referring to Table 4 and FIG. 1, when a source node (e.g., source processor 12) issues a source broadcast request for data, each of the target processors or nodes (e.g., target processor 14 and nodes 20) may provide a non-data response. As listed in Table 3, the cache coherency protocol employs five different types of non-data responses: a general snoop response (MISS), a snoop hit shared response (SHARED), a snoop conflict response (CONFLICT), a snoop read conflict response (RD-CONF), and a snoop hit FPP mode MAF response (FPP). It is thus possible that, in response to a source broadcast request for data, the source processor 12 can receive several different non-data responses. The CONFLICT, RD-CONF, and FPP non-data responses help account for the fact that there may be more than one source processor issuing requests for the same data at any given time. Accordingly, the source processor 12 requester can employ a conflict state machine associated with the MAF entry for the source broadcast request to manage conflicts that may result from any given SSP broadcast request for data.

Figure 3:
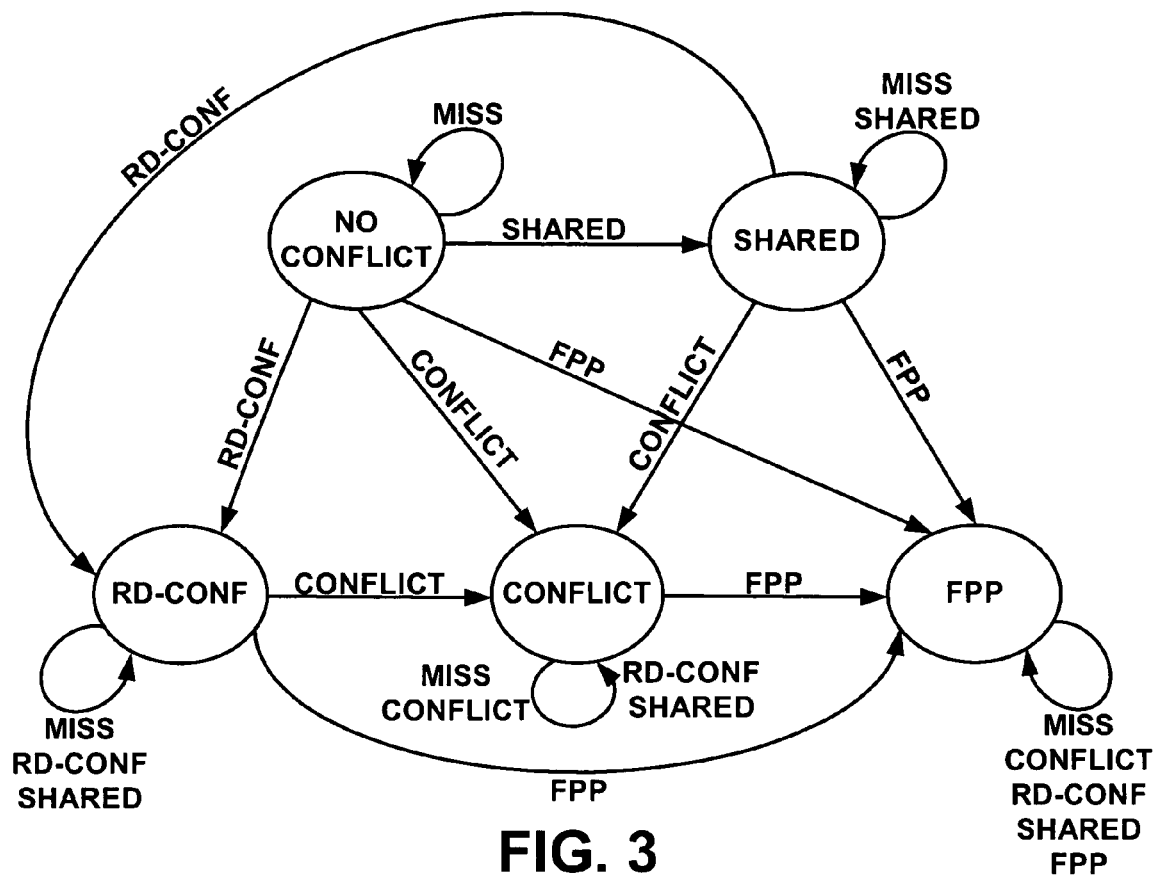
FIG. 3 depicts an example of a conflict state flow diagram that may be implemented in a coherency protocol.

FIG. 3 depicts an example of a conflict state diagram that represents operation of a conflict state machine that can be utilized to manage non-data responses returned to a source node. The example data state diagram of FIG. 3 implements non-data responses set forth in Table 3. As shown in the conflict state diagram of FIG. 3, an FPP response has priority over the MISS, SHARED, RD-CONF, and CONFLICT responses. Thus, the FPP response can transition the cache state machine to the FPP state, regardless of the other responses received at the source node. The CONFLICT response takes priority over the MISS, SHARED, and RD-CONF responses and thus transitions the conflict state machine to the CONFLICT state. The RD-CONF response takes priority over the MISS and SHARED responses and thus transitions the conflict state machine to the RD-CONF state. The SHARED response takes priority over the MISS response and thus transitions the conflict state machine to the SHARED state. The MISS response does not transition the state of the conflict state machine. As shown in the diagram of FIG. 3, once the conflict state machine transitions to a given state, any subsequent lower priority responses will not result in a state transition.

In a conflict state machine (see FIG. 3) associated with a MAF, the transition to the RD-CONF state may be triggered by receiving a RD-CONF response from a snooped target node. The RD-CONF transition may also be triggered by receiving an XREADN or an XREADM request from another node. In a conflict state machine associated with a MAF at the source node, the CONFLICT transition may be triggered by receiving a CONFLICT response from a snooped node. The CONFLICT transition may also be triggered by receiving an XRDINVAL, XUPGRADE, XINVAL, or XWRITE request from another node. The CONFLICT transition may further be triggered by receiving a SET-CONF message from the data state machine associated with the MAF.

One type of conflict situation can occur when two or more processors each have an outstanding request for the same line of data and a MAF associated with their respective requests. The response issued by a responding target processor of the group of conflicting processors depends on the MAF state for the conflicting request of the responding target processor. A list of example target processor responses that may be issued in conflict cases according to the cache coherency protocol described herein is depicted below in Table 5.

TABLE 5

| Source Request Type | MAF State at Target | Next MAF State at Target | Response to Source |
|---|---|---|---|
| Any Broadcast Read or Write | Any FPP Request (Except Victim) | Unchanged | FPP |
| | Any Victim: XINVAL XWRITE | Unchanged | CONFLICT |
| | Broadcast Reads: XREADN XREADM + DSM ≠ D-DATA* XREADC RD-CONF | Per Conflict State Machine | RD-CONF |

TABLE 5-continued

| Source Request Type | MAF State at Target | Next MAF State at Target | Response to Source |
|---|---|---|---|
| | Broadcast Writes: XRDINVAL XUPGRADE N XREADM + DSM = D-DATA* CONFLICT | Per Conflict State Machine | CONFLICT |

*DSM = Data State Machine

As shown in Table 5, if a target node has an outstanding MAF in any FPP request state except a victim request when the source broadcast read or write request is received, the target node issues an FPP response to the source node and the target node MAF state remains unchanged. If a target node has an outstanding MAF in a FPP victim request state when the source broadcast read or write request is received, the target node issues a CONFLICT response to the source node and the target node MAF state remains unchanged. Also, if a target node has an outstanding MAF in one of the broadcast read states set forth in Table 5 when the source broadcast read or write request is received, the target node issues a RD-CONF response to the source node and the target node MAF state transitions according to the conflict state machine (see, e.g., FIG. 3). Further, if a target node has an outstanding MAF in one of the broadcast write states set forth in Table 5 when the source broadcast read or write request is received, the target node issues a CONFLICT response to the source node and the target node MAF state transitions according to the conflict state machine.

After all target nodes have responded to a source broadcast read/write request issued by a source node, the action taken at the source node proceeds according to several factors. These factors include the type of source broadcast read/write request issued by the source node, the resulting state of the data state machine (see, e.g., FIG. 2), and the resulting state of the conflict state machine (see, e.g., FIG. 3).

Referring back to FIG. 1, the source processor 12 may transmit a source broadcast non-migratory read snoop (XREADN, see, e.g., Table 2) to the other processor 14, to the memory 16, and to the other nodes 20 via the system interconnect 18. The other nodes in the system respond to the XREADN request by providing either a data response or a non-data response (see, e.g., Table 3), depending on factors such as the state of the respective nodes when the request is received and whether there is a conflict with the request, as described herein. The responses drive the data state machine and conflict state machine at the source processor associated with the XREADN request, as described herein (see, e.g., FIGS. 2 and 3). Once all responses to the XREADN request have returned from the nodes in the system 10, the resulting action taken at the source processor 12 is determined in accordance with the resulting data state/conflict state combinations, such as set forth below in Table 6.

TABLE 6

| Data State Machine | Conflict State Machine | Action Taken at Source Node |
|---|---|---|
| NO-DATA | Don't Care | Transition to FPP mode and reissue using FPP request. |
| Don't Care | FPP | Transition to FPP mode and reissue using FPP request. |
| S-DATA | NO-CONFLICT, SHARED, RD-CONF | Fill cache with S-DATA, transition cache line to S-state, and retire MAF. |

TABLE 6-continued

| Data State Machine | Conflict State Machine | Action Taken at Source Node |
|---|---|---|
| S-DATA | CONFLICT | FILL-INVALID—Fill cache with S-DATA for single use, transition cache line to I-state, and retire MAF. |
| D-DATA | Don't Care | Error—D-DATA not returned for XREADN. |
| M-DATA | NO-CONFLICT, SHARED | Fill cache with M-DATA, transition cache line to E-state, F-state, or S-state, and retire MAF. |
| M-DATA | RD-CONF | Fill cache with M-DATA, transition cache line to S-state, and retire MAF. |
| M-DATA | CONFLICT | Transition to FPP mode and reissue using FPP request. |

According to the cache coherency protocol described herein, an example sequence of events for an XREADN transaction is as follows:
1. Allocate an entry in a source node MAF.
2. Broadcast the XREADN commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. After all snoop responses have returned from other nodes, take actions as determined in XREADN snoop resolution Table 6 based on the data state machine and conflict state machine associated with the MAF entry.

The source processor 12 may also transmit a source broadcast migratory read snoop (XREADM, see, e.g., Table 2) to the other processor 14, to the memory 16, and to the other nodes 20 via the system interconnect 18. The other nodes in the system respond to the XREADM request by providing either a data response or a non-data response (see, e.g., Table 3), depending on factors such as the state of the respective nodes when the request is received and whether there is a conflict with the request, as described herein. The responses drive the data state machine and conflict state machine associated with the XREADM request, as described herein. After all responses to the XREADM request have returned from the nodes in the system 10, the resulting action taken at the source processor 12 is determined in accordance with the resulting data state/conflict state combinations, such as set forth below in Table 7.

TABLE 7

| Data State Machine | Conflict State Machine | Action Taken at Source Node |
|---|---|---|
| NO-DATA | Don't Care | Transition to FPP mode and reissue using FPP request. |
| S-DATA | FPP | Transition to FPP mode and reissue using FPP request. |
| S-DATA | NO-CONFLICT, SHARED, RD-CONF | Fill cache with S-DATA, transition cache line to S-state, and retire MAF. |
| S-DATA | CONFLICT | FILL-INVALID—Fill cache with S-DATA for single use, transition cache line to I-state, and retire MAF. |
| D-DATA | NO-CONFLICT | Fill cache with D-DATA, transition cache line to D-state, and issue MACK. |

TABLE 7-continued

| Data State Machine | Conflict State Machine | Action Taken at Source Node |
|---|---|---|
| D-DATA | SHARED | Fill cache with D-DATA, transition cache line to D-state, and issue MACK. |
| D-DATA | RD-CONF, CONFLICT | Fill cache with D-DATA, transition cache line to D-state, transition to migratory mode and issue XINVAL. Issue MACK/MACK-ACK sequence when XINVAL acknowledged. |
| D-DATA | FPP | Fill cache with D-DATA, transition cache line to O-state, transition to migratory mode and issue XINVAL. Issue MACK when XINVAL acknowledged. Transition to FPP and reissue using FPP request upon MACK-ACK. |
| M-DATA | NO-CONFLICT, SHARED | Fill cache with M-DATA, transition cache line to F-state or S-state, and retire MAF. |
| M-DATA | RD-CONF | Fill cache with M-DATA, transition cache line to S-state, and retire MAF. |
| M-DATA | CONFLICT, FPP | Transition to FPP mode and reissue using FPP request. |

According to the cache coherency protocol described herein, an example sequence of events for an XREADM transaction is as follows:

1. Allocate an entry in a source node MAF.
2. Broadcast the XREADM commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. After all snoop responses have returned from other nodes, take actions as determined in XREADM snoop resolution Table 7 based on the data state machine and conflict state machine associated with the MAF entry.
5. If XREADM snoop resolution Table 7 indicates a transition to "migratory mode," broadcast XINVAL commands to all processors.
6. Respond to third party snoops in accordance with the "Broadcast Writes" target MAF state entry of processor snoop response for conflict cases Table 5.
7. After all XINVAL responses have returned, initiate an MACK/MACK-ACK sequence.

The source processor 12 may also transmit a source broadcast read current snoop (XREADC, see Table 2) to the other processor 14, to the memory 16, and to the other nodes 20 via the system interconnect 18. The other nodes in the system 10 respond to the XREADC request by providing either a data response or a non-data response (see Table 3), depending on factors such as the state of the respective nodes when the request is received and whether there is a conflict with the request, as described herein. The responses drive the data state machine and conflict state machine at the source processor 12 associated with the XREADC request, as described herein. After all responses to the XREADC request have returned from the nodes in the system 10, the resulting action taken at the source processor 12 is determined in accordance with the resulting data state/conflict state combinations, as set forth below in Table 8.

TABLE 8

| Data State Machine | Conflict State Machine | Action Taken at Source Node |
|---|---|---|
| NO-DATA | Don't Care | Transition to FPP mode and reissue using FPP request. |
| S-DATA | FPP | Transition to FPP mode and reissue using FPP request. |
| S-DATA | NO-CONFLICT, SHARED, RD-CONF, CONFLICT | FILL-INVALID—Fill cache with S-DATA for single use, transition cache line to I-state, and retire MAF. |
| D-DATA | Don't Care | Error—D-DATA not returned for XREADC. |
| M-DATA | NO-CONFLICT, SHARED, RD-CONF | FILL-INVALID—Fill cache with M-DATA for single use, transition cache line to I-state, and retire MAF. |
| M-DATA | CONFLICT, FPP | Transition to FPP mode and reissue using FPP request. |

According to the cache coherency protocol described herein, an example sequence of events for an XREADC transaction is as follows:

1. Allocate an entry in a source node MAF.
2. Broadcast the XREADC commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. After all snoop responses have returned from other nodes, take actions as determined in XREADC snoop resolution Table 8 based on the data state machine and conflict state machine associated with the MAF entry.

The source processor 12 may also transmit a source broadcast read and invalidate line with owner snoop (XRDINVAL, see, e.g., Table 2) to the other processor 14, to the memory 16, and to the other nodes 20 via the system interconnect 18. The other nodes in the system respond to the XRDINVAL request by providing either a data response or a non-data response (see, e.g., Table 3), depending on factors such as the state of the respective nodes when the request is received and whether there is a conflict with the request, as described herein. The responses drive the data state machine and conflict state machine associated with the XRDINVAL request, as described herein. After all responses to the XRDINVAL request have returned from the nodes in the system 10, the resulting action taken at the source processor 12 is determined in accordance with the resulting data state/conflict state combinations, as set forth below in Table 9.

TABLE 9

| Data State Machine | Conflict State Machine | Action Taken at Source Node |
|---|---|---|
| NO-DATA | Don't Care | Transition to FPP mode and reissue using FPP request. |
| S-DATA | Don't Care | Error—S-DATA not returned for XRDINVAL. |
| Don't Care | SHARED | Error—XRDINVAL should return MISS response. |
| D-DATA | NO-CONFLICT, RD-CONF, CONFLICT | Fill cache with D-DATA, transition cache line to D-state, and issue MACK. |

TABLE 9-continued

| Data State Machine | Conflict State Machine | Action Taken at Source Node |
|---|---|---|
| D-DATA | FPP | Fill cache with D-DATA, transition cache line to O-state, and issue MACK. |
| M-DATA | NO-CONFLICT, RD-CONF | Fill cache with M-DATA, transition cache line to E-state, and retire MAF. |
| M-DATA | CONFLICT, FPP | Transition to FPP mode and reissue using FPP request. |

According to the cache coherency protocol described herein, an example sequence of events for an XRDINVAL transaction are as follows:

1. Allocate an entry in a source node MAF.
2. Broadcast the XRDINVAL commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. When all snoop responses have returned from other nodes, take actions as determined in XRDINVAL snoop resolution Table 9 based on the data state machine and conflict state machine associated with the MAF entry.
5. If the XRDIWVAL snoop resolution Table 9 indicates an "Issue MACK" action, initiate MACK/MACK-ACK sequence.

The source processor 12 may also transmit a source broadcast upgrade/invalidate line snoop (XUPGRADE, see, e.g., Table 2) to the other processor 14, to the memory 16, and to the other nodes 20 via the system interconnect 18. The other nodes in the system respond to the XUPGRADE request by providing a non-data response (see, e.g., Table 3), depending on factors such as the state of the respective nodes when the request is received and whether there is a conflict with the request, as described herein. The responses drive the data state machine and conflict state machine associated with the XUPGRADE request, as described herein. After all responses to the XUPGRADE request have returned from the nodes in the system 10, the resulting action taken at the source processor 12 is determined in accordance with the resulting data state/conflict state combinations, such as set forth below in Table 10.

TABLE 10

| Data State Machine | Conflict State Machine | Action Taken at Source Node |
|---|---|---|
| NO-DATA | NO-CONFLICT, RD-CONF, CONFLICT | Transition cache line to D-state, and retire MAF. |
| NO-DATA | SHARED | Error—XUPGRADE should return MISS response. |
| NO-DATA | FPP | Transition to FPP mode and reissue using FPP request. |
| S-DATA, D-DATA | Don't Care | Error—Data is not returned for XUPGRADE (source node is owner). |
| M-DATA | Don't Care | Error—No message sent to memory for XUPGRADE. |

According to the cache coherency protocol described herein, an example sequence of events for an XUPGRADE transaction is as follows:

1. Allocate an entry in a source node MAF.
2. Broadcast the XUPGRADE commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. After all snoop responses have returned from other nodes, take actions as determined in XUPGRADE snoop resolution Table 10 based on the data state machine and conflict state machine associated with the MAF entry.

By way of further example, assume that the processor 12 (a source node) requires a copy of data associated with a particular memory address, and assume that the data is unavailable from its own local cache 22. Since the processor 12 does not contain a copy of the requested data, the cache line of the processor may be initially in the I-state (invalid) for that data or it may contain different data altogether. For purposes of simplicity of explanation, the starting state of the source node cache line for this and other examples is the I-state. The processor 12, operating as the source node, transmits a source broadcast non-migratory read snoop (XREADN) to the other processor 14, to the memory 16, and to the other nodes 20 via the system interconnect 18.

In this example, it is assumed that, at the time of the XREADN request, at least one other processor (e.g., processor 14) in the system 10 has an outstanding XREADN request for the same data. It is further assumed that yet another processor (e.g., one of the other nodes 20) is an owner node, i.e., a cached ordering point for the data. For this example, assume that the owner node 20 has a copy of the data in an E-state or F-state cache line of the owner node.

Upon receiving the XREADN request broadcast from the source processor 12, the memory 16 will return an M-DATA response and the owner node 20 will return an S-DATA response (see Table 3). Upon receiving the XREADN request broadcast from the source processor 12, the target node 14 will return an RD-CONF response because the target node has a pending XREADN request for the same data (see Table 5). Referring to the data state diagram of FIG. 2, the S-DATA response from the owner node 20 has priority over the M-DATA response from memory 16. As a result, after all responses have been received from the nodes of the system 10, the data state machine associated with the XREADN request of the source processor 12 is in the S-DATA state. Referring to the conflict state diagram of FIG. 3, the RD-CONF response from the target processor 14 places the conflict state machine associated with the XREADN request of the source processor 12 in the RD-CONF state. After all responses to the XREADN request have returned from the nodes in the system 10, the resulting action taken at the source processor 12 is determined in accordance with the XREADN snoop resolution table (Table 6).

Referring to Table 6, since the data state machine is in the S-DATA state and the conflict state machine is in the RD-CONF state, the resulting action taken at the source node 12 is to fill the source node cache with the S-DATA and transition the source node cache line associated with the data to the S-state. Thus, in this example, according to the cache coherency protocol described herein, the source processor 12 cache is filled with S-DATA in response to the XREADN request, even though there is a RD-CONF with the target processor 14. The cache coherency protocol thus avoids having to transition to the FPP mode and issuance of an FPP request in this read conflict scenario because the source processor 12 cache is filled in response to the source broadcast request.

As another example, assume that the source processor 12 transmits a source broadcast non-migratory read snoop (XREADN) to the other processor 14, to the memory 16, and to the other nodes 20 via the system interconnect 18. In this example, it is assumed that, at the time of the XREADN request, at least one other processor (e.g., processor 14) in the system 10 has an outstanding broadcast write request (e.g., XRDINVAL) for the same data. It is further assumed that yet another processor (e.g., one of the other nodes 20) is an owner node, i.e., a cached ordering point for the data. For this example, assume that the owner node 20 has a copy of the data in an E-state or F-state cache line of the node.

Upon receiving the XREADN request broadcast from the source processor 12, the memory will return an M-DATA response and the owner node 20 will return an S-DATA response (see Table 3). Upon receiving the XREADN request broadcast from the source processor 12, the target node 14 will return a CONFLICT response because the target node has a pending XRDINVAL request for the same data (see Table 5). Referring to the data state diagram of FIG. 2, the S-DATA response from the owner node 20 has priority over the M-DATA response from memory 16. As a result, after all responses have been received from the nodes of the system 10, the data state machine associated with the XREADN request of the source processor 12 is in the S-DATA state. Referring to the conflict state diagram of FIG. 3, the CONFLICT response from the target processor 14 places the conflict state machine associated with the XREADN request of the source processor 12 in the CONFLICT state. After all responses have returned from the nodes in the system 10, the resulting action taken at the source processor 12 is determined in accordance with Table 6.

As shown in Table 6, since the data state machine is in the S-DATA state and the conflict state machine is in the CONFLICT state, the resulting action taken at the source node 12 is to FILL-INVALID, i.e., fill the source node cache with the data and transition the source node cache line associated with the data to the I-state. Thus, in this example, according to the cache coherency protocol described herein, the source processor 12 cache is filled with the data, which affords the source processor a single use of the data. If the source processor 12 requires the data for further use, another SSP source broadcast read can be issued. This occurs even though there is a conflict (CONFLICT) with the target processor 14. The cache coherency protocol thus provides for avoiding transition to the FPP mode and issuance of an FPP request in this write/read conflict scenario.

The above examples illustrate two conflict scenarios that lead to two of the data state/conflict state combinations of Table 6. It will be appreciated that the other data state/conflict state combinations of Table 6 would similarly result in the corresponding source node actions illustrated in Table 6. It will also be appreciated that the various data state and conflict state combinations of Table 6 may arise in a virtually limitless number of circumstances involving an XREADN request with conflict and non-conflict scenarios. Regardless of the scenario under which these data state/conflict state combinations are achieved, the action taken at the XREADN source node will be determined according to the data state/conflict state combination when all responses are received at the source node. Thus, for example, if the data state machine indicates NO-DATA after all snoop responses have been received, the request is reissued in the FPP mode, as set forth in Table 6. As another example, if the conflict state machine indicates FPP (e.g., another node has an outstanding FPP request for the data), the request is reissued in the FPP mode, as set forth in Table 6. As a further example, if the data state machine indicates M-DATA and the conflict state machine indicates CONFLICT, the request is reissued in the FPP mode, as set forth in Table 6.

The examples set forth above illustrate the operation of the cache coherency protocol described herein in response to an XREADN request (see Table 6). It will be appreciated that the cache coherency protocol described herein would operate in accordance with the actions set forth in Tables 7-10 in the event of a source node broadcasting an XREADM, XREADC, XRDINVAL, or XUPGRADE request, respectively. In the event that a source node broadcasts one of these requests, the target nodes of the system 10 would respond as dictated in Tables 3-5. Based on these responses, the data state machine (see, e.g., FIG. 2) and conflict state machine (see, e.g., FIG. 3) associated with the request would assume their respective states in the manner described herein. The action taken at the source node would be dictated by the resulting data state/conflict state combination, as set forth in the appropriate one of Tables 7-10.

Figure 4:
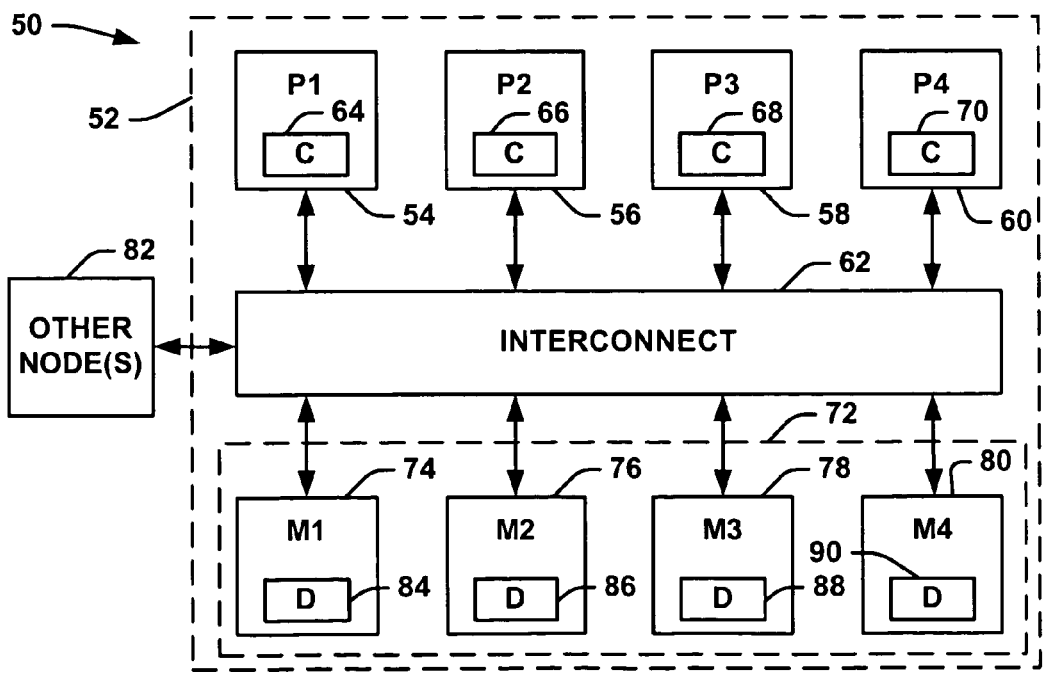
FIG. 4 depicts an example of another multi-processor system.

FIG. 4 depicts an example of a multi-processor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58, and 60 are depicted in the example of FIG. 2, those skilled in the art will appreciate that a greater or smaller number of processors can be implemented in the node 52.

Each processor 54, 56, 58, and 60 also includes an associated cache 64, 66, 68 and 70. The caches 64, 66, 68, and 70 can enable faster access to data than from an associated main memory 72 of the node 52. The system 50 implements a cache coherency protocol designed to guarantee coherency of data in the system. By way of example, the cache coherency protocol can be implemented to include a source broadcast protocol in which broadcast snoops or requests for data are transmitted directly from a source processor to all other processors and memory in the system 50. The source broadcast protocol can further be implemented in conjunction with another forward progress protocol, such as a null-directory or other directory-based protocol. The system 50 of FIG. 2, for example, employs the source broadcast protocol to process a request for data. If the request cannot be processed using the source broadcast protocol, such as where a conflict exists, the system 50 transfers to its forward progress protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can operate as a home node for predetermined lines of data stored in the memory 72. Each memory module 74, 76, 78, 80 thus can employ a table, such as a DIFT (data in flight table) (D1, D2, D3, D4) 84, 86, 88, 90, for keeping track of references that are in flight after the ordering point and for limiting the number of pending transactions to the same line allowed after the ordering point. Additionally, each of the memory modules 74, 76, 78 and 80 can include a directory (not shown), such as for use in a directory-based protocol. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58, and 60 and the memory 70, as well as those to and from the other nodes 82.

When a processor 56 requires desired data, the processor 56 operates as a source and issues a source broadcast snoop (e.g., a broadcast read or broadcast write request) to all other processors 54, 58 and 60 as well as to memory 72 via the interconnect 62. The cache coherency protocol described herein is designed to ensure that a correct copy of the data is returned in response to the source broadcast snoop.

By way of example, assume that the processor 54 (a source node) requires a copy of data associated with a particular memory address, and assume that the data is unavailable from its own local cache 64. Since the processor 54 does not contain a copy of the requested data, the cache line of the processor may be initially in the I-state (invalid) for that data or it may contain different data altogether. For purposes of simplicity of explanation, the starting state of the source node cache line for this and other examples is the I-state. The processor 54, operating as the source node, transmits a source broadcast migratory read snoop (XREADM) to the other processors 56, 58, and 60, to the memory 72, and to the other nodes 82 via the interconnect 62.

In this example, it is assumed that, at the time of the XREADM request, at least one other processor (e.g., processor 56) in the system 10 has an outstanding read request (e.g., an XREADM or XREADN request) for the same data. It is further assumed that yet another processor (e.g., processor 58) is an owner node, i.e., a cached ordering point for the data. For this example, assume that the owner node 58 has a copy of the data in an M-state cache line.

Upon receiving the XREADM request broadcast from the source processor 12, the memory will return an M-DATA response and the owner node 58 will return a D-DATA response (see Table 3). Upon receiving the XREADM request broadcast from the source processor 54, the target node 56 may return an RD-CONF response because the target node has a pending read request for the same data (see, e.g., Table 5).

Referring to the data state diagram of FIG. 2, the D-DATA response from the owner node 58 has priority over the M-DATA response from memory 72. As a result, after all responses have been received from the nodes of the system 50, the data state machine associated with the XREADM request of the source processor 54 is in the D-DATA state. Referring to the conflict state diagram of FIG. 3, the RD-CONF response from the target processor 56 places the conflict state machine associated with the XREADM request of the source processor 54 in the RD-CONF state. Once all responses to the XREADM request have returned from the nodes in the system 50, the resulting action taken at the source processor 54 is determined in accordance with the XREADM snoop resolution table (Table 7), above.

As shown in Table 7, since the data state machine is in the D-DATA state and the conflict state machine is in the RD-CONF state, the resulting action taken at the source node 54 is to fill the source node cache with the D-DATA and transition the source node cache line associated with the data to the D-state. Thereafter, the source node 54 transitions to a migratory mode, in which the node 54 broadcasts an invalidate command (XINVAL) that invalidates the cache line associated with the data at the processor 56, i.e., the cache line of the processor 56 transitions to the I-state. Next, source node 54 initiates an MACK/MACK-ACK sequence to complete the ordering point migration from the owner node 58. Once the MACK-ACK response is received at the source node 54, the MAF associated with the XREADM request at the source node is retired leaving the source node cache line in the D-state. Thus, in this example, according to the cache coherency protocol described herein, the source processor 54 cache is filled with D-DATA in response to the XREADM request, even though there is a read conflict (RD-CONF) with the target processor 56. Also, in this example, the ordering point for the data migrates from the target processor 56 to the source processor 54, i.e., ownership of the data transfers from the target processor 56 to the source processor 54 without updating memory. The cache coherency protocol thus provides for avoiding transition to the FPP mode and issuance of an FPP request in this read conflict scenario while providing for ordering point migration.

The above example illustrates but a single conflict scenario that leads to one of the data state/conflict state combinations of Table 7. It will be appreciated that the other data state/conflict state combinations of Table 7 would similarly result in the corresponding source node actions illustrated in Table 7. It will also be appreciated that the various data state and conflict state combinations of Table 7 can result from a great number of XREADM circumstances involving conflict and non-conflict scenarios. The action taken at the XREADM source node will be determined according to the data state/conflict state combination after all responses have been received at the source node.

For example, if the data state machine indicates NO-DATA after all snoop responses have been received, the request is reissued in the FPP mode, as set forth in Table 7. As another example, if the conflict state machine indicates FPP and the data state machine indicates S-DATA or M-DATA, the request is reissued in the FPP mode, as set forth in Table 7. As a further example, if the conflict state machine indicates FPP and the data state machine indicates D-DATA, the source node cache is filled with the D-DATA and transitions to the O-state. Thereafter, the source node transitions to a migratory mode, in which the node broadcasts an XINVAL that invalidates the cache line associated with the data at the other nodes. After the XINVAL is acknowledged by the other processors, an MACK/MACK-ACK sequence is initiated and, when completed, the source node transitions to the FPP mode and reissues the read request using an FPP request. Alternatively, the source node could implement other forward progress techniques (e.g., retrying the request in an SSP mode or employing a token based protocol).

The examples set forth above illustrate the operation of the cache coherency protocol described herein in response to an XREADM request (see, e.g., Table 7). It will be appreciated that the cache coherency protocol described herein would operate in accordance with the actions set forth in Tables 6 and 8-10 in the event of a source node broadcasting an XREADN, XREADC, XRDINVAL, or XUPGRADE request, respectively. In the event that a source node broadcasts one of these requests, the target nodes of the system 50 would respond as dictated in Tables 3-5. Based on these responses, the data state machine (see, e.g., FIG. 2) and conflict state machine (see, e.g., FIG. 3) associated with the request would assume their respective states in the manner described herein. The action taken at the source node would be dictated by the resulting data state/conflict state combination, as set forth in the appropriate one of Tables 6 and 8-10.

Figure 5:
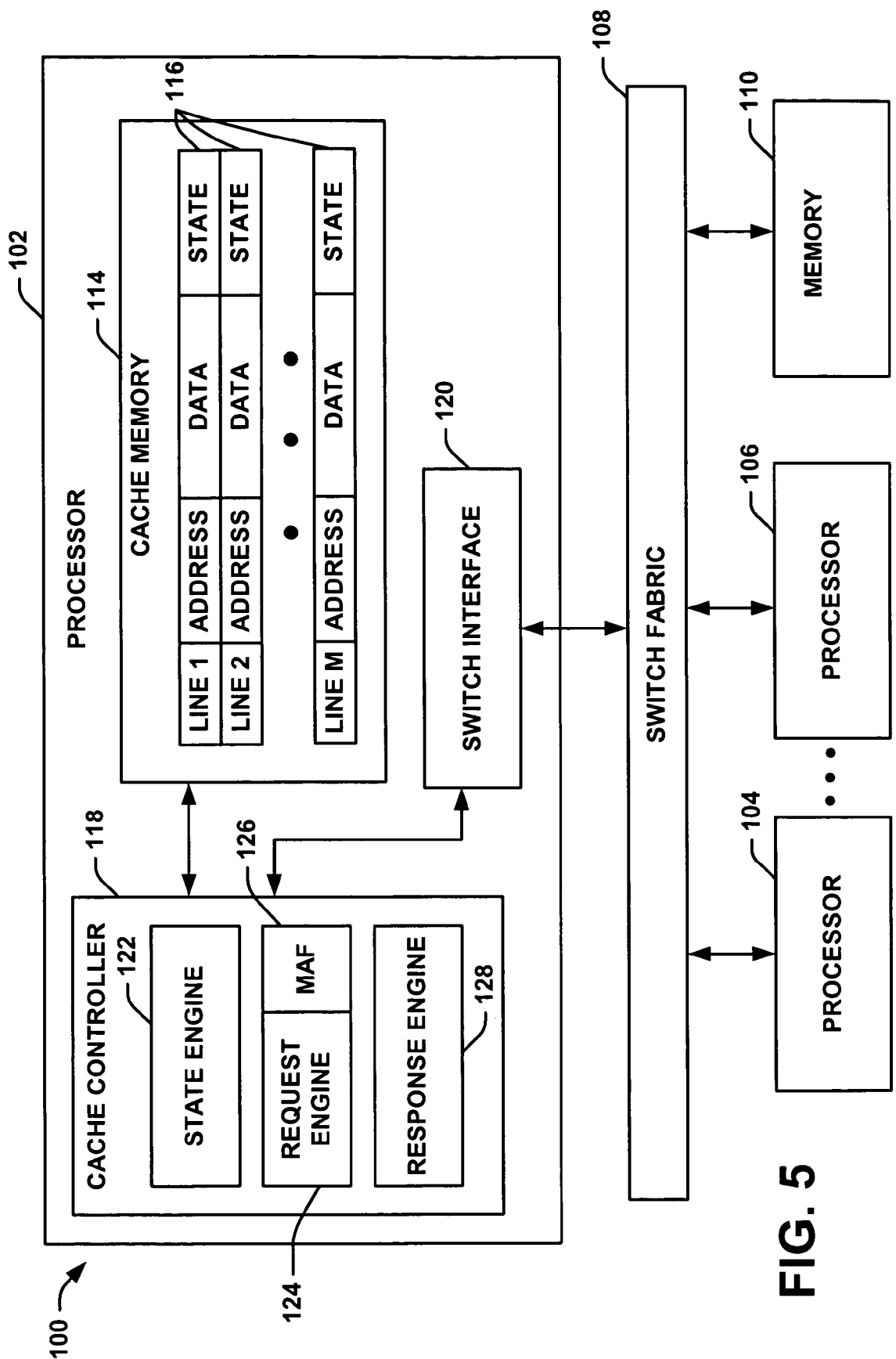
FIG. 5 depicts an example of a processor within a multi-processor system.

FIG. 5 depicts an example of another multi-processor system 100 that includes a plurality of processors 102, 104 and 106 in communication with each other via a switch fabric 108. The system 100 also includes associated memory 110, which can be organized as a single address space that is shared by the processors 102, 104, and 106. For example, the memory 110 can be implemented as a plurality of separate memory modules associated with each of the respective processors 102, 104, and 106 for storing data. The system 100, for example, can be implemented as an integrated circuit or as circuitry containing plural integrated circuits.

The system 100 can employ a source broadcast or source-snoopy cache coherency protocol. For this type of protocol, a source processor 102, 104, and 106 can issue a source broadcast request to all other processors in the system and to the memory 110. In the event that conflict arises, or the source broadcast request otherwise fails, the source processor can employ a forward progress technique to complete the transaction. For example, the source processor can transfer to a forward-progress protocol, such as a null-directory or other directory-based protocol, and reissue the request using such protocol.

In a null-directory-based protocol, for example, the memory 110 includes home nodes for each cache line. Instead of issuing a broadcast to all cache targets, the source issues a single request to the home node for such data. The home node thus operates as static ordering point for requested data since all requests are sent to the home node for ordering before snoops are broadcast. This tends to add an additional hop for the majority of references compared with a broadcast-based protocol described above. If the system employs a standard directory-based protocol, ordering is implemented, but the memory 110 employs associated directories that facilitate locating the data (e.g., based on the directory state associated with the requested data). In a standard directory protocol, there will be times when the directory can indicate that there are no cached copies, and thus the home node can respond with the data without issuing any snoops to the system 100.

The processor 102 includes cache memory 114 that contains a plurality of cache lines 116 (e.g., lines 1-M, where M is a positive integer, M≧1). Each cache line 116 can contain one or more memory blocks. A tag address (ADDRESS) is associated with the data contained in each cache line 116. Additionally, each cache line 116 can contain state information identifying the state of the data contained at that cache line. Examples of states that can be associated with each cache line 116 are identified above in Table 1.

A cache controller 118 is associated with the cache memory 114. The cache controller 118 controls and manages access to the cache memory, including requests for data and responses. The cache controller 118 communicates requests and responses via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor.

In the example of FIG. 5, the cache controller 118 includes a state engine 122 that controls the state of each respective line 116 in the cache memory 114. The state engine 122 is programmed and/or configured to implement state transitions for the cache lines 116 based on predefined rules established by the cache coherency protocol described herein. For example, the state engine 122 can modify the state of a given cache line 116 based on requests issued by the processor 102. Additionally, the state engine 122 can modify the state of a given cache line 116 based on responses received at the processor 102 for the given tag address, such as may be provided by another processor 104, 106 and/or the memory 110.

The cache controller 118 also includes a request engine 124 that sends requests to the system 100. The request engine 124 employs a miss address file (MAF) 126 that contains MAF entries for outstanding requests associated with some subset of the locations in the cache memory 114. The MAF can be implemented as a table, an array, a linked list or other data structure programmed to manage and track requests for each cache line. For example, when the processor 102 requires data associated with a given tag address for a given line 116, the request engine 124 creates a corresponding entry in the MAF 126. The MAP entry includes fields that identify, for example, the tag address of the data being requested, the type of request, and response information received from other nodes in response to the request. The request engine 124 thus employs the MAF 126 to manage requests issued by the processor 102 as well as responses to such requests. The request engine can employ a data state machine and conflict state machine (see, e.g., FIGS. 2 and 3) associated with each MAF entry for helping to manage a data state and a conflict state associated with each MAF entry.

The cache controller 118 also includes a response engine 128 that controls responses provided by the processor 102. The processor 102 provides responses to requests or snoops received via the switch interface 120 from another processor 104 and 106 or memory 110. The response engine 128, upon receiving a request from the system 100, cooperates with the state engine 122 and the MAF 126 to provide a corresponding response based on the type of request and the state of data contained in the cache memory 114. For example, if a MAF entry exists for a tag address identified in a request received from another processor or memory, the cache controller can implement appropriate conflict resolution defined by the coherency protocol. The response engine thus enables the cache controller to send an appropriate response to requesters in the system 100. A response to a request can also cause the state engine 122 to effect a state transition for an associated cache line 116.

By way of example, assume that the processor 102 requires data not contained locally in its cache memory 114. The request engine 124 will create a MAF entry in the MAF 126, corresponding to the type of request and the tag address associated with data required. In this example, assume that the processor 102 issues a broadcast read and invalidate line request (XRDINVAL, see Table 2) and a corresponding entry in the MAF 126. Assume also that the processor 104 is an owner node for the data and includes the data in a D-state cache line. Assume further that the processor 106 has an outstanding XRDINVAL MAF for the same data. The cache controller 118 broadcasts a source snoop XRDINVAL request to the nodes of the system 100 via the switch interface 120 and switch fabric 108.

In response to receiving the XRDINVAL request from the source node 102, the memory 110 provides an M-DATA response. The owner node 104 provides a D-DATA response and transitions to the T-state in accordance with the data migration procedures of the cache coherency protocol (see Table 4). The processor 106, having an outstanding XRDINVAL MAF for the data, responds to the XRDINVAL by providing a non-data CONFLICT response (see Table 5).

Referring to the data state diagram of FIG. 2, the D-DATA response from the owner node 104 has priority over the M-DATA response from memory 110. As a result, after all responses have been received from the nodes of the system 100, the data state machine associated with the MAF entry for the XRDINVAL request of the source node 102 is in the D-DATA state. Referring to the conflict state diagram of FIG. 3, the CONFLICT response from the processor 106 causes the conflict state machine associated with the XRDINVAL request of the source processor 102 to transition to the CONFLICT state. After all responses to the XRDINVAL request have returned from the nodes in the system 100, the resulting action taken at the source processor 102 can be determined in accordance with the XRDINVAL snoop resolution Table 9.

As shown in Table 9, since the data state machine is in the D-DATA state and the conflict state machine is in the CONFLICT state, the resulting action taken at the source node 102 is to fill the source node cache with the D-DATA and transition the source node cache line associated with the data to the D-state. Thereafter, the source node 102 issues an MACK to the node 104. Upon receiving an MACK-ACK response from the node 104, the node 104 retires the MAF and thus becomes the owner node for the data. Thus, in this example, according to the cache coherency protocol described herein, the source processor 102 cache is filled with D-DATA in response to the XRDINVAL request, even though there is a conflict (CONFLICT) with the processor 106. The cache coherency protocol thus provides for avoiding transition to the FPP mode and issuance of an FPP request in this read conflict scenario.

The above example illustrates but a single conflict scenario that leads to one of the data state/conflict state combinations of Table 9. It will be appreciated that the other data state/conflict state combinations of Table 9 can result in the corresponding source node actions illustrated in Table 9. It will also be appreciated that the various data state and conflict state combinations of Table 9 can result from a great number of XRDINVAL circumstances involving conflict and non-conflict scenarios. Regardless of the scenario under which these data state/conflict state combinations are achieved, the action taken at the XRDINVAL source node will be determined according to the data state/conflict state combination after all responses are received at the source node.

For example, if the data state machine indicates NO-DATA after all snoop responses have been received, the request is reissued in the FPP mode, as set forth in Table 9. As another example, if the conflict state machine indicates FPP and the data state machine indicates M-DATA, the request is reissued in the FPP mode, as set forth in Table 9. As a further example, if the conflict state machine indicates FPP and the data state machine indicates D-DATA, the source node cache is filled with the D-DATA and transitions to the O-state. Thereafter, the source node initiates an MACKIMACK-ACK sequence and, when completed, the source node transitions to the FPP mode and reissues the write request using an FPP request.

The examples set forth above illustrate the operation of the cache coherency protocol described herein in response to an XRDINVAL request (see Table 9). It will be appreciated that the cache coherency protocol described herein would operate in accordance with the actions set forth in Tables 6-8, and 10 in the event of a source node broadcasting an XREADN, XREADM, XREADC, or XUPGRADE request, respectively. In the event that a source node broadcasts one of these requests, the target nodes of the system 100 would respond as dictated in Tables 3-5. Based on these responses, the data state machine (see FIG. 2) and conflict state machine (see FIG. 3) associated with the request would assume their respective states in the manner described herein. The action taken at the source node would be dictated by the resulting data state/conflict state combination, as set forth in the appropriate one of Tables 6-8 and 10.

The various examples of conflict scenarios depicted herein so far have been addressed from the perspective of only one of the conflicting processors in a given conflict scenario and considering the conditions at the other node to be essentially static. These examples have not addressed the fact that in a conflict scenario, the source node and target node designations are relative. To illustrate this point, consider two processors, A and B, each of which have outstanding requests for the same data and therefore conflict with each other. From the point of view of processor A, processor A is the source node and processor B is the target node. From the point of view of processor B, processor B is the source node and processor A is the target node. It will thus be appreciated that in conflict scenarios, conflicting requests are handled by the cache coherency protocol at both conflicting nodes in the manner described herein. It will also be appreciated that the manner in which the requests of the conflicting processors are handled can depend in large part on the timing of the creation and/or retirement of the respective MAF entries at the conflicting processors and the timing of the respective snoops/responses of the conflicting processors.

In view of the foregoing structural and functional features described above, certain methods that can be implemented using a coherency protocol will be better appreciated with reference to FIGS. 6-11. FIGS. 6-10 depict various example timing diagrams for conflict scenarios that can arise in a multi-processor system employing a cache coherency protocol as described herein. Each of the examples illustrates various interrelationships between requests and responses and state transitions that can occur for a given memory tag address in different memory devices or caches. In each of these examples, time flows in the direction of an arrow labeled "TIME." Those skilled in the art may appreciate various other conflict scenarios that can arise in a multi-processor system employing a cache coherency protocol as described herein.

Figure 6:
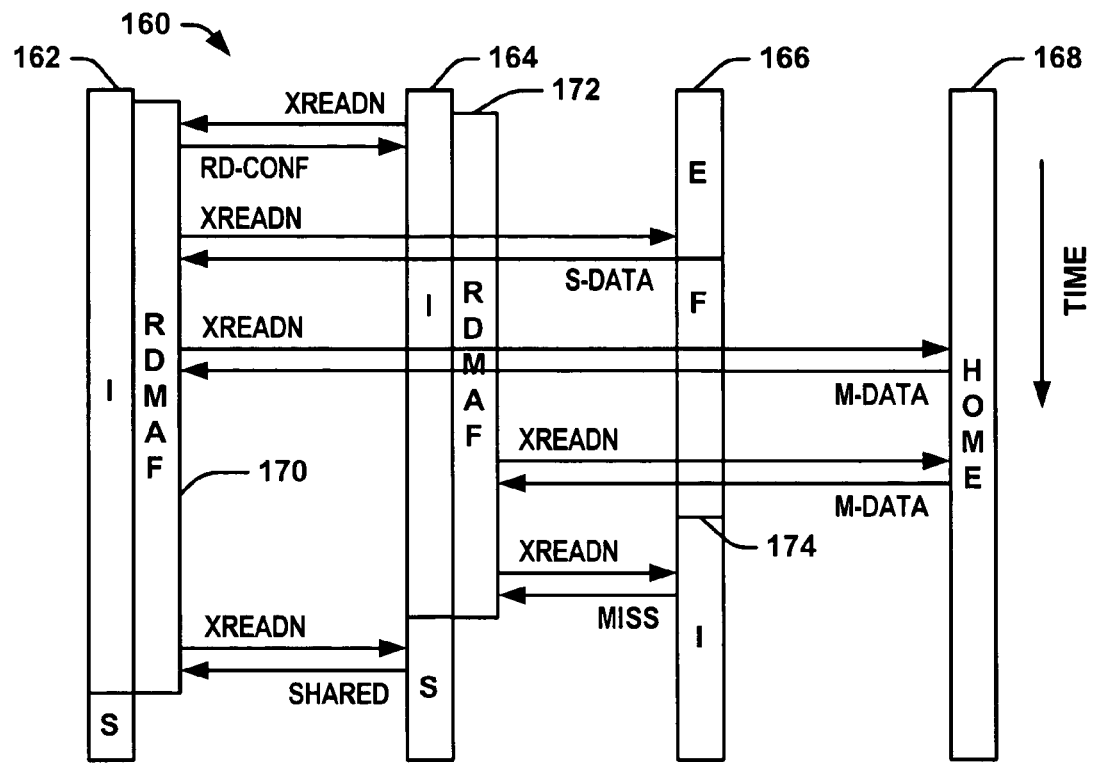
FIG. 6 depicts a first example conflict scenario illustrating state transitions for a coherency protocol.

FIG. 6 illustrates a network 160 that includes processor nodes 162, 164, and 166 and a home node 168. Initially, nodes 162 and 164 are in an I-state for a particular cache line and node 166 is in the E-state for the cache line. The home node 168 contains a memory copy of the data associated with the cache line. In this example case, node 162 allocates a read MAF entry (RDMAF) 170 and, thereafter, node 164 allocates a read MAF entry 172 for the requested data. Next, node 164 receives a read conflict (RD-CONF) response (see, e.g., Table 5) to a non-migratory read request (XREADN) broadcast from node 164 to node 162. Next, node 162 receives an S-DATA response to an XREADN request broadcast from node 162 to node 166. Node 166, upon providing the S-DATA response to node 162, transitions to the first among equals state (F-state, see, e.g., Table 4). Next, node 162 receives an M-DATA response to an XREADN request broadcast from node 162 to home node 168. Next, node 164 receives an M-DATA response to an XREADN request broadcast from node 164 to home node 168. Thereafter, node 166 silently evicts the cache line and transitions the cache line to invalid (I-state), as indicated at 174. Next, node 164 receives a MISS response to XREADN request broadcast from node 164 to node 166 (because the XREADN request broadcast by node 164 found the I-state cache line at node 166).

At this point, responses have been received from all of the nodes to which node 164 broadcast snoop requests. Referring to FIG. 2, the data state machine for the MAF 172 at node 164, having received the M-DATA response from the home node 168 and no other data responses, transitions to the M-DATA state. Referring to FIG. 3, the conflict state machine for the MAF 172 at node 164, having received the RD-CONF response from node 162 and the MISS response from node 166, transitions to the RD-CONF state. Referring to the XREADN snoop resolution table (Table 6), for the data state/conflict state combination of M-DATA and RD-CONF, the action taken at the source node 164 for the XREADN MAF 172 is to fill the cache line with the M-DATA, transition the cache line to the shared state (S-state), and retire the MAF 172. Thus, according to the cache coherency protocol described herein, in this read conflict scenario, the cache line of node 164 is filled with a shared copy of the requested data, even though there is a conflicting read request from another node.

After node 164 has transitioned to the S-state, node 162 receives a SHARED response to an XREADN request broadcast from node 162 to node 164. At this point, responses have been received from all of the nodes to which node 162 broadcast snoop requests. Referring to FIG. 2, the data state machine for the MAF 170 at node 162, having received the M-DATA response from the home node 168 and S-DATA from node 166, transitions to the S-DATA state. Referring to FIG. 3, the conflict state machine for the MAF 170 at node 162, having received the SHARED response and the XREADN request from node 164, transitions to the RD-CONF state due to the XREADN request. Referring to Table 6, for the data state/conflict state combination of S-DATA and RD-CONF, the action taken at the source node 162 for the XREADN MAF 170 is to fill the cache line with the S-DATA, transition the cache line to the S-state, and retire the MAF 170. Thus, according to the cache coherency protocol described herein, in this read conflict scenario, the cache line of node 162 is filled with a shared copy of the requested data, even though there is a conflicting read request from another node.

Figure 7:
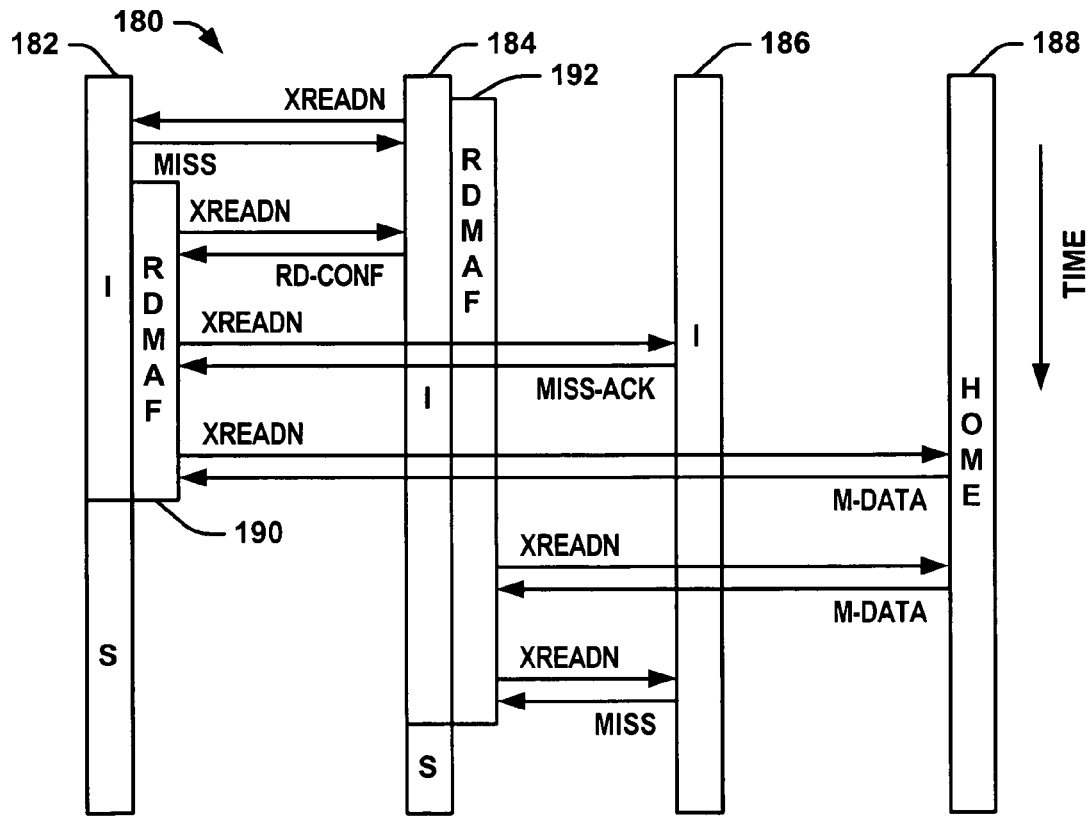
FIG. 7 depicts a second example conflict scenario illustrating state transitions for a coherency protocol.

FIG. 7 illustrates an example scenario in which a network 180 includes processor nodes 182, 184, and 186 and a home node 188. Initially, nodes 182, 184, and 186 are in an I-state for a particular cache line and the home node 188 contains a memory copy of the data associated with the cache line. In this example case, node 184 allocates a read MAF entry 192 and broadcasts an XREADN request to node 182, which returns a MISS response indicating that the cache line is invalid at node 182. Next, node 182 allocates a read MAF entry 190 and broadcasts an XREADN request to node 184, which returns a RD-CONF response. Next, node 182 receives a MISS response to an XREADN request broadcast from node 182 to node 186, indicating that the cache line for the requested data at node 186 is invalid. Next, node 182 receives an M-DATA response to an XREADN request broadcast from node 182 to home node 188.

At this point, responses have been received from all of the nodes to which node 182 broadcast snoop requests. Referring to FIG. 2, the data state machine for the MAF 190 at node 182, having received the M-DATA response from the home node 188 and no other data responses, transitions to the M-DATA state. Referring to FIG. 3, the conflict state machine for the MAF 190 at node 182, having received the RD-CONF response from node 184 and the MISS response from node 186, transitions to the RD-CONF state. Referring to Table 6, for the data state/conflict state combination of M-DATA and RD-CONF, the action taken at the source node 182 for the XREADN MAF 190 is to fill the cache line with the M-DATA, transition the cache line to the S-state, and retire the MAF 192. Thus, according to the cache coherency protocol described herein, in this read conflict scenario, the cache line of node 182 is filled with a shared copy of the requested data, even though there is a conflicting read request from another node.

After node 182 has transitioned to the S-state, node 184 receives an M-DATA response to an XREADN request broadcast from node 184 to home node 188. Next, node 184 receives a MISS response to an XREADN request broadcast from node 184 to node 186. At this point, responses have been received from all of the nodes to which node 184 broadcast snoop requests. Referring to FIG. 2, the data state machine for the MAF 192 at node 184, having received the M-DATA response from the home node 188 and no other data responses, transitions to the M-DATA state. Referring to FIG. 3, the conflict state machine for the MAF 192 at node 184, having received the MISS responses from node 182 and node 186 and the XREADM request from node 190, transitions to the RD-CONF state. Referring to Table 6, for the data state/conflict state combination of M-DATA and RD-CONF, the action taken at the source node 184 for the XREADN MAF 192 is to fill the cache line with the M-DATA, transition the cache line to the S-state, and retire the MAF 192. Thus, according to the cache coherency protocol described herein, in this read-conflict scenario, the cache line of node 182 is filled with a shared copy of the requested data, even though there is a conflicting read request from another node. It should be noted that, in the example illustrated in FIG. 7, even though there were conflicting MAFs 190 and 192, node 184 never "saw" the conflict (i.e., never received a RD-CONF response from node 180) because of the timing of the events illustrated in FIG. 7.

Figure 8:
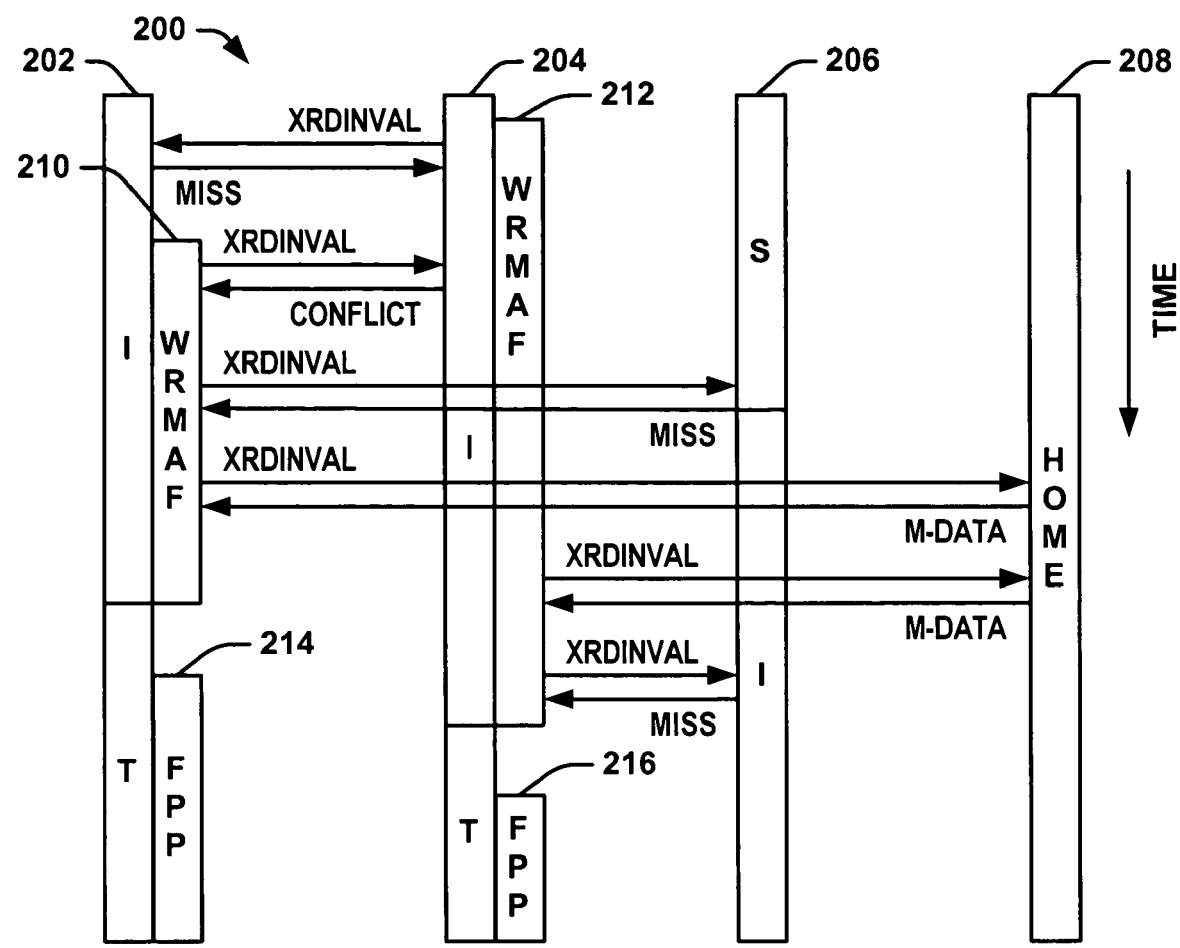
FIG. 8 depicts a third example conflict scenario illustrating state transitions for a coherency protocol.

FIG. 8 illustrates an example scenario in which a network 200 includes processor nodes 202, 204, and 206 and a home node 208. Initially, nodes 202 and 204 are in an I-state for a particular cache line and node 206 is in the S-state for the cache line. The home node 208 contains a memory copy of the data associated with the cache line. In this example case, node 204 allocates a write MAF entry (WRMAF) 212 and broadcasts a read and invalidate line with owner request (XRDINVAL) to node 202, which returns a MISS response indicating that the cache line is invalid at node 202. Next, node 202 allocates a write MAF entry 210 and broadcasts an XRDINVAL request to node 204, which returns a CONFLICT response indicating that there is a write conflict with the outstanding MAF 212 at node 204. Next, node 202 receives a MISS response to an XRDINVAL request broadcast from node 202 to node 206. The cache line for the requested data at node 206 transitions to the I-state. Next, node 202 receives an M-DATA response to an XRDINVAL request broadcast from node 202 to home node 208.

At this point, responses have been received from all of the nodes to which node 202 broadcast snoop requests. Referring to FIG. 2, the data state machine for the MAF 210 at node 202, having received the M-DATA response from the home node 208 and no other data responses, transitions to the M-DATA state. Referring to FIG. 3, the conflict state machine for the MAF 210 at node 202, having received the CONFLICT response from node 204 and the MISS response from node 206, transitions to the CONFLICT state. Referring to the XRDINVAL snoop resolution table (Table 9), for the data state/conflict state combination of M-DATA and CONFLICT, the action taken at the source node 202 for the XRDINVAL MAF 210 is to transition to the FPP mode and reissue the request using an FPP request, as indicated at 214. Thus, in this write conflict scenario shown in the example of FIG. 8, the cache coherency protocol described herein forces node 202 to transition to the FPP mode due to the conflicting write request from node 204.

After node 206 has transitioned to the I-state, node 204 receives an M-DATA response to an XRDINVAL request broadcast from node 204 to home node 208. Next, node 204 receives a MISS response to an XRDINVAL request broadcast from node 204 to node 206, node 206 having already been invalidated by the XRDINVAL request from node 202. At this point, responses have been received from all of the nodes to which node 204 broadcast snoop requests. Referring to FIG. 2, the data state machine for the MAF 212 at node 204, having received the M-DATA response from the home node 208, transitions to the M-DATA state. Referring to FIG. 3, the conflict state machine for the MAF 212 at node 204, having received the MISS response from nodes 202 and 206 and the XRDINVAL request from node 210, transitions to the CONFLICT state due to the XRDINVAL request. Referring to Table 9, for the data state/conflict state combination of M-DATA and CONFLICT, the action taken at the source node 204 for the XRDINVAL MAF 212 is to transition to the FPP mode and reissue the request using an FPP request, as indicated at 216. Thus, according to the cache coherency protocol described herein, in this write conflict scenario, the cache coherency protocol described herein forces node 204 to transition to the FPP mode due to the conflicting write request from node 202. It should be noted that, in the example illustrated in FIG. 8, even though there were conflicting MAFs 210 and 212, node 204 never "saw" the conflict (i.e., never received a CONFLICT response from node 200) because of the timing of the communications between the nodes.

Figure 9:
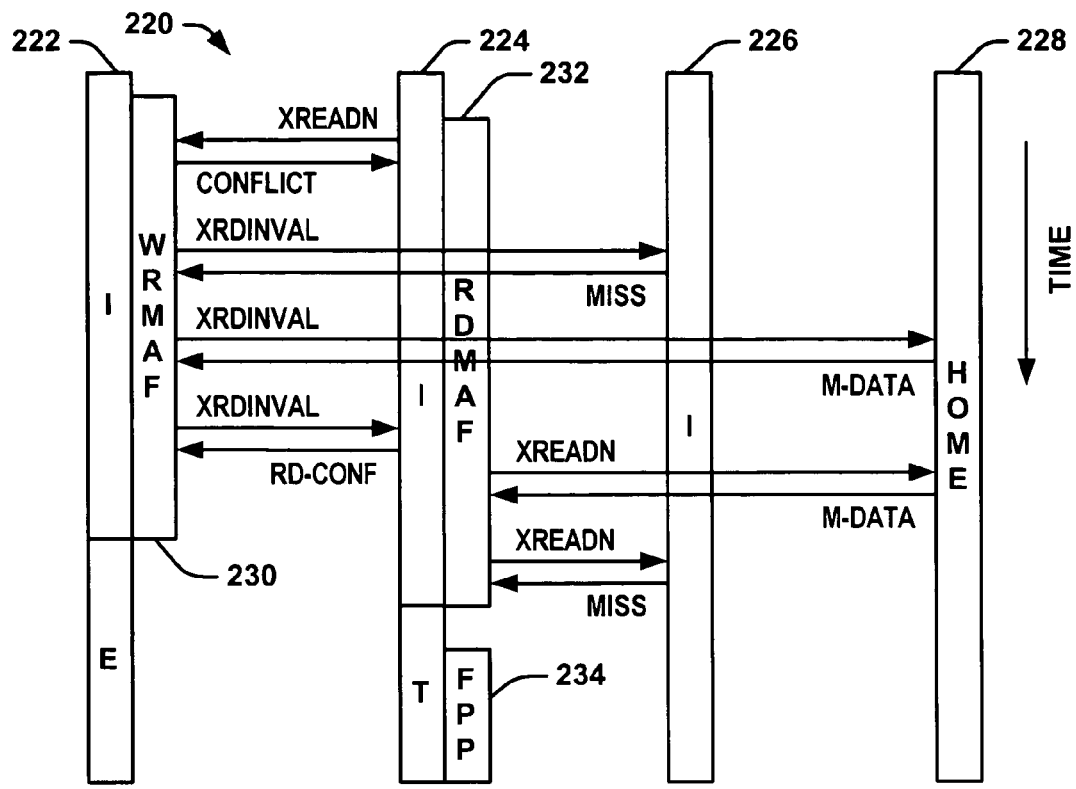
FIG. 9 depicts a fourth example conflict scenario illustrating state transitions for a coherency protocol.

FIG. 9 illustrates an example scenario in which a network 220 includes processor nodes 222, 224, and 226 and a home node 228. Initially, nodes 222, 224, and 226 are in an I-state for a particular cache line and home node 228 contains a memory copy of the data associated with the cache line. In this example case, node 222 allocates a WRMAF entry 230 and, thereafter, node 224 allocates a read MAF entry 232. Node 224 receives a CONFLICT response to an XREADN request broadcast from node 224 to node 222, due to the pending write MAF 230 at node 222. Next, node 222 allocates a write MAF entry 230 and broadcasts an XRDINVAL request to node 226, which returns a MISS response acknowledging the invalidate line request. Next, node 222 receives an M-DATA response to an XRDINVAL request broadcast from node 222 to home node 228. Next, node 222 receives a RD-CONF response to an XRDINVAL request broadcast from node 222 to node 224, due to the pending read MAF 232 at node 224.

At this point, responses have been received from all of the nodes to which node 222 broadcast snoop requests. Referring to FIG. 2, the data state machine for the MAF 230 at node 222, having received the M-DATA response from the home node 228 and no other data responses, transitions to the M-DATA state. Referring to FIG. 3, the conflict state machine for the MAF 230 at node 222, having received the RD-CONF response from node 224 and the MISS response from node 226, transitions to the RD-CONF state. Referring to Table 9, for the data state/conflict state combination of M-DATA and RD-CONF, the action taken at the source node 222 for the XRDINVAL MAF 230 is to fill the cache line with the M-DATA, transition the cache line to the E-state, and retire the MAF 230. Thus, according to the cache coherency protocol described herein, in this write/read conflict scenario, the cache line of node 222 (the writer) is filled with an exclusive copy of the requested data, even though there is a conflicting read request from another node.

Meanwhile, node 224 receives an M-DATA response to an XREADN request broadcast from node 224 to home node 228. Next, node 224 receives a MISS response to an XREADN request broadcast from node 224 to node 226. At this point, responses have been received from all of the nodes to which node 224 broadcast snoop requests. Referring to FIG. 2, the data state machine for the MAF 232 at node 224, having received the M-DATA response from the home node 228, transitions to the M-DATA state. Referring to FIG. 3, the conflict state machine for the MAF 232 at node 224, having received the MISS response from node 226 and the CONFLICT response from node 222, transitions to the CONFLICT state. Referring to Table 6, for the data state/conflict state combination of M-DATA and CONFLICT, the action taken at the source node 224 for the XREADN MAF 232 is to transition to the FPP mode and reissue the request using an FPP request, as indicated at 234. Thus, in the write/read conflict scenario of the example of FIG. 9, the cache coherency protocol described herein forces node 224 (the reader) to transition to the FPP mode due to the conflicting write request from node 222.

Figure 10:
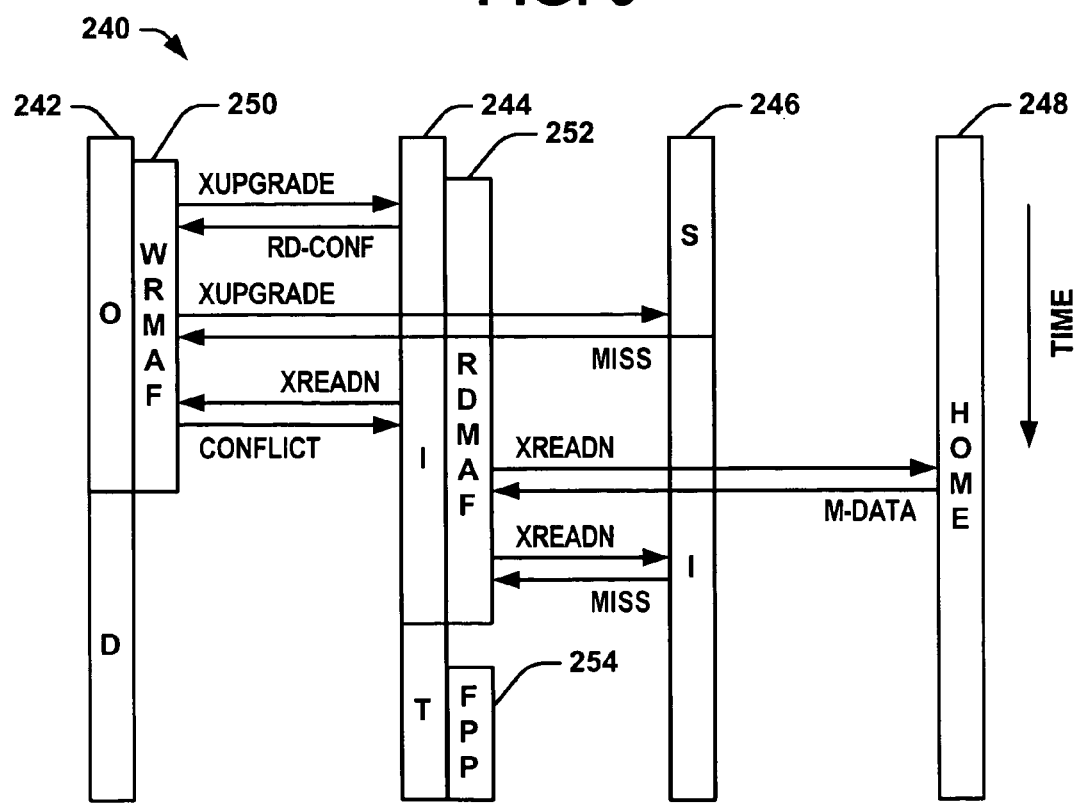
FIG. 10 depicts a fifth example conflict scenario illustrating state transitions for a coherency protocol.

FIG. 10 illustrates an example scenario in which a network 240 includes processor nodes 242, 244, and 246 and a home node 248. Initially, node 242 is in an owner state (O-state) for a particular cache line, node 244 is in an I-state for the cache line, and node 246 is in an S-state for the cache line. Home node 248 contains a memory copy of the data. In this example case, node 242 allocates a WRMAF entry 250 and, thereafter, node 244 allocates a RDMAF entry 252. Next, node 242 broadcasts an upgrade/invalidate line request (XUPGRADE ) request to node 244, which, having a pending read MAF 252, returns a RD-CONF response. Next, node 242 receives a MISS response to an XUPGRADE request broadcast from node 242 to node 246. Node 246 transitions to the I-state in response to the XUPGRADE request from node 242. Next, node 244 receives a CONFLICT response to an XREADN request broadcast from node 244 to node 242. Node 242 returns the CONFLICT response because node 242 has a pending XUPGRADE WRMAF 250.

At this point, responses have been received from all of the nodes to which node 242 broadcast snoop requests. Note that, by definition, an XUPGRADE snoop is not broadcast to home node 248. Thus, responses to all snoops have been received at source node 242. Referring to FIG. 2, the data state machine for the MAF 250 at node 242, having received no data responses, remains in the NO_DATA state. Referring to FIG. 3, the conflict state machine for the MAF 250 at node 242, having received the RD-CONF response from node 244 and the MISS response from node 246, transitions to the RD-CONF state. Referring to the XUPGRADE snoop resolution table (Table 10), for the data state/conflict state combination of NO_DATA and RD-CONF, the action taken at the source node 242 for the XUPGRADE MAF 250 is to is to transition the cache line to the D-state, and retire the MAF 250. Thus, according to the cache coherency protocol described herein, in this write/read conflict scenario, node 242 (the writer) is permitted to invalidate the cache line, even though there is a conflicting read request from another node.

Meanwhile, node 244 receives an M-DATA response to an XREADN request broadcast from node 244 to home node 248. Next, node 244 receives a MISS response to an XREADN request broadcast from node 244 to node 246, node 246 having transitioned to the I-state. At this point, responses have been received from all of the nodes to which node 244 broadcast snoop requests. Referring to FIG. 2, the data state machine for the MAF 252 at node 244, having received the M-DATA response from the home node 248, transitions to the M-DATA state. Referring to FIG. 3, the conflict state machine for the MAF 252 at node 244, having received the MISS response from node 246 and the CONFLICT response from node 242, transitions to the CONFLICT state. Referring to Table 6, for the data state/conflict state combination of M-DATA and CONFLICT, the action taken at the source node 244 for the XREADN MAF 252 is to transition to the FPP mode and reissue the request using an FPP request, as indicated at 254. Thus, in the write/read conflict scenario shown in the example of FIG. 10, the cache coherency protocol described herein forces node 244 (the reader) to transition to the FPP mode due to the conflicting write request from node 242.

Figure 11:
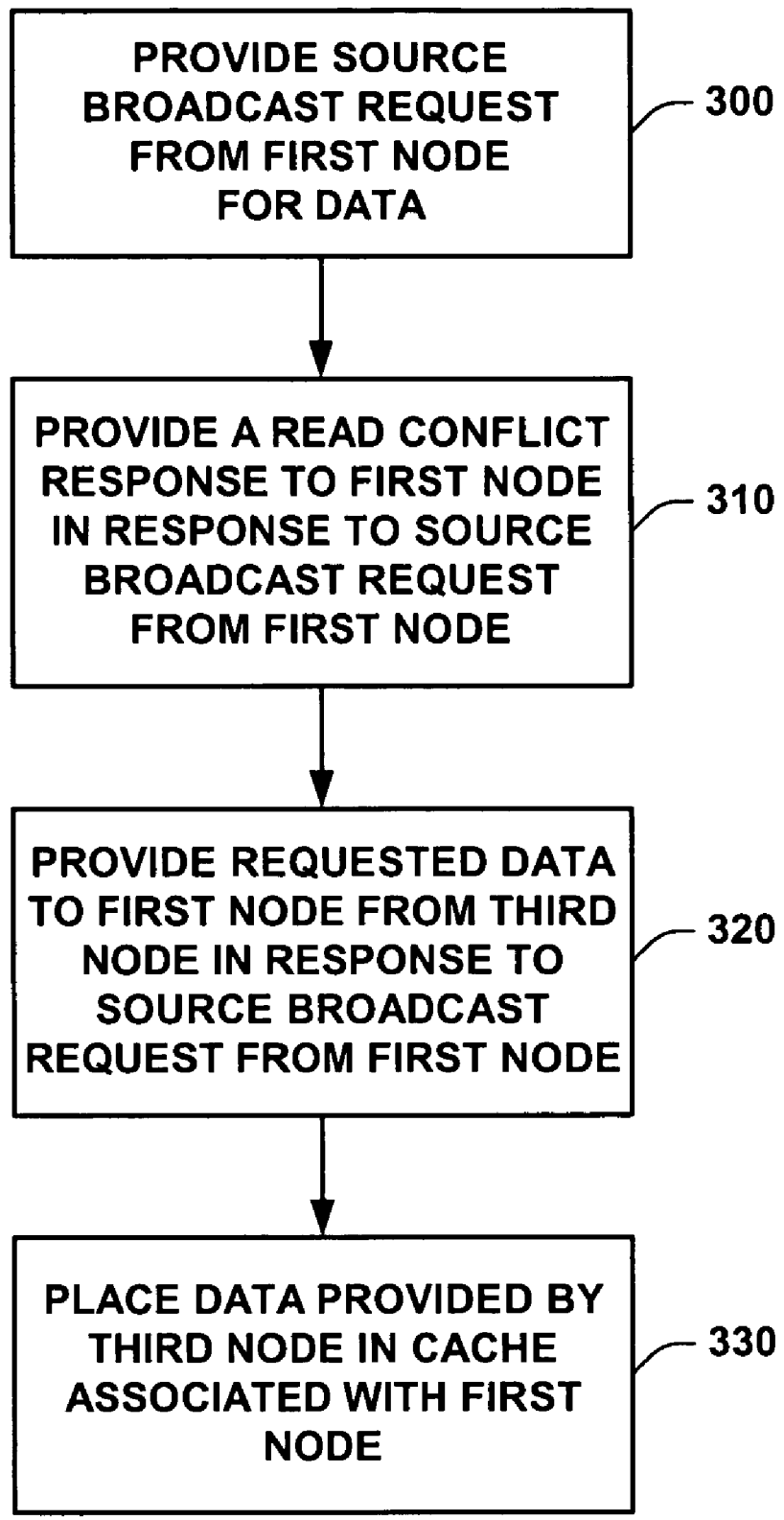
FIG. 11 depicts a flow diagram illustrating a method.

FIG. 11 depicts a method that includes providing a source broadcast request from a first node for data, as indicated at 300. The method also includes providing a read conflict response to the first node from a second node in response to the source broadcast request from the first node, as indicated at 310. The read conflict response shown at 310 indicates that the second node has a pending broadcast read request for the data. The method also includes providing the requested data to the first node from a third node in response to the source broadcast request from the first node, as indicated at 320. The method further includes placing the data provided by the third node in a cache associated with the first node, as indicated at 330.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
   a first node, which defines a first processor, provides a broadcast request for a copy of data, the first node including a conflict state machine for managing non-data responses to the broadcast request for the data provided from the first node, the first node receiving a read conflict response to the broadcast request from the first node, the read conflict response indicating that a second node, which defines a second processor, has a pending broadcast read request for the data, the conflict state machine transitioning to a conflict state based on the read conflict response being a highest non-data response in response to the first node receiving the read conflict response;
   a third node that provides the requested copy of the data to the first node in response to the broadcast request from the first node, the first node filling the copy of the data provided by the third node in a cache associated with the first node based on the state of the conflict state machine; and
   a hybrid cache coherency protocol including a broadcast source snoop protocol implemented in conjunction with a forward progress protocol, wherein each of the first and second processors employs the broadcast source snoop protocol to issue a snoop request for the data and provide responses for the data, and wherein if the snoop request fails in the broadcast source snoop protocol, the hybrid cache coherency protocol transitions to the forward progress protocol and each of the first and second processors reissues a request for the data using the forward progress protocol;
   the broadcast request provided by the first node is broadcast using a source broadcast cache coherency protocol, the source broadcast cache coherency protocol being chosen by the first node based on the state of the conflict state machine.

2. The system of claim 1, wherein the broadcast request provided by the first node is a source broadcast read request.

3. The system of claim 2, wherein the first node provides a read conflict response to the broadcast read request from the second node, the read conflict response provided by the first node indicating that the broadcast read request of the first node conflicts with the pending broadcast read request of the second node.

4. The system of claim 3, wherein the third node provides the requested data to the second node in response to the broadcast read request from the second node, the second node filling the data provided by the third node in a cache associated with the second node.

5. The system of claim 1, wherein the request for data broadcast by the first node is a source broadcast write request.

6. The system of claim 5, wherein the first node provides a second conflict response to the pending broadcast read request from the second node, the second conflict response provided by the first node indicating that the write request broadcast by the first node conflicts with the broadcast read request from the second node.

7. The system of claim 6, wherein the third node provides the requested data to the second node in response to the pending broadcast read request of the second node, the second conflict response provided by the first node preventing the second node from filling the data provided by the third node in a cache associated with the second node.

8. The system of claim 6, wherein the third node provides shared data to the second node in response to the pending broadcast read request of the second node, the second node filling a cache associated with the second node with the shared data and associating an invalid state with the shared data filled in the cache associated with the second node.

9. The system of claim 6, wherein the broadcast request provided by the first node is broadcast using a first cache coherency protocol, the first cache coherency protocol being chosen by the first node based on the state of the conflict state machine, the second node in response to the second conflict response provided by the first, node reissues the pending broadcast read request of the second node.

10. The system of claim 9, wherein the first cache coherency protocol is a source broadcast cache coherency protocol and the second node reissues the broadcast read request using a forward progress cache coherency protocol.

11. The system of claim 1, wherein the third node comprises one, of a home node and an owner node.

12. The system of claim 1, the first and second processors having an associated cache, the associated caches of the first and second processors each comprising a plurality of cache lines, each cache line having a respective lag address that identifies associated data and each cache line having state' information that indicates a state of the associated data for the respective cache line, the first and second processors being capable of communicating with each other and with other nodes of the system through an interconnect.

13. The system of claim 12, further comprising a first cache controller associated, with the first processor and a second cache controller associated with the second processor, the first cache controller being operative to manage data requests and responses for the associated cache of the first processor, the first cache controller effecting state transitions associated with the data in the associated cache of the first processor based on the data requests and responses for the associated cache of the first processor the, second cache controller being, operative to manage data requests and responses for the associated cache of the second processor, the second cache controller effecting state transitions associated with the data in the associated cache of the second processor based on the data requests and responses for the associated cache of the second processor.

14. The system of claim 12, wherein the system implements a hybrid cache coherency protocol wherein each of the first, second and third processors employs a source broadcast based protocol to issue a request for the data and provide responses for the data, and employs an associated second protocol to reissue a request for the data in response to the request failing in the source broadcast protocol, the second protocol employing a forward progress technique.

15. A multi-processor network comprising:
a first processor node operative to issue a first source broadcast request for data, the first processor node including a conflict state machine for managing non-data responses to the first source broadcast request for the data;
a second processor node operative to issue a second source broadcast request for the data;
a third node operative to provide a data response in response to the respective source broadcast requests of the first and second processor nodes, the third node being one of an owner processor node and a memory node;
the second processor node being operative to provide a read conflict response to the first source broadcast request when the second source broadcast request is a read request, the second processor node being operative to provide a second conflict response to the first source broadcast request when the second source broadcast request is a write request;
the conflict state machine transitioning to a first conflict state of a plurality of conflict states based on the read conflict response being a highest non-data response in response to the first processor node receiving the read conflict response, and the conflict state machine transitioning to a second conflict state of the plurality of conflict states in response to the first processor node receiving the second conflict response;
the first processor node being operative to implement a cache fill with the data provided by the third node if the conflict state machine transitions to the first conflict state; and
a hybrid cache coherency protocol including a broadcast source snoop protocol implemented in conjunction with a forward progress protocol, wherein each of the first and second processors employs the broadcast source snoop protocol to issue a snoop request for the data and provide responses for the data, wherein if any of the first and second source broadcast requests fails in the broadcast source snoop protocol, the hybrid cache coherency protocol transitions to the forward progress protocol and each of the first and second processors reissues a request for the data using the forward progress protocol;
the broadcast request provided by the first node is broadcast using a source broadcast cache coherency protocol, the source broadcast cache coherency protocol being chosen by the first node based on the state of the conflict state machine.

16. The multi-processor network of claim 15, wherein the first processor node is operative to issue a request for the data using a forward progress technique if the conflict state machine transitions to the second conflict state in response to the first processor node receiving the second conflict response.

17. The multi-processor, network of claim 16, wherein the first processor node is prevented from implementing the cache fill with the data provided by the third node if the conflict state machine transitions to the second conflict state in response to the first processor node receiving the second conflict response.

18. The multi-processor network of claim 15, wherein the first source broadcast request is one of a source broadcast write request and a source broadcast read request.

19. The multi-processor network of claim 15, wherein the source broadcast request issued by the first processor node exists concurrently with the source broadcast request issued by the second processor node.

20. The multi-processor network of claim 15, wherein the third node provides shared data to the second processor node in response to the second processor node providing the second source broadcast request as a broadcast read request, the second processor node filling the shared data in a cache associated with the second processor node and associating an invalid state with the data in the cache associated with the second processor node.

21. The multi-processor network of claim 15, wherein the third node is a third processor node and each of the, first, second, and third processor nodes has an associated cache that comprises a plurality of cache lines, each cache line having a respective tag address that identifies associated data and having state information that indicates a state of the associated data for the respective cache line, the first, second, and third processor nodes being capable of communicating with each other and with other nodes of the system through an interconnect, the multi-processor network further comprising a first cache controller associated with the first processor node, a second cache controller associated with the second processor node, and a third cache controller associated with the third processor node, the first cache controller being operative to manage data requests and responses for the associated cache of the first processor, the first cache controller effecting state transitions associated with the data in the associated cache of the first processor based on the data, requests and responses for the associated cache of the first processor the second cache controller being operative to manage data requests and responses for the associated cache of the second processor, the second cache controller effecting state transitions associated with the data in the associated cache of the second processor based on the data requests and responses for the associated cache of the second processor, the third cache controller being operative to manage data requests and responses for the associated cache of the third processor, the third cache controller effecting state transitions associated with the data in the associated cache of the third processor based on the data requests and responses for the associated cache of the third processor.

22. The multi-processor network of claim 15, wherein the third node is third processor node the network implements a hybrid cache coherency protocol in which each of the first, second, and third processor nodes employs a source broadcast based protocol to issue requests for data and provide responses to requests, and employs an associated protocol employing a forward progress technique to reissue a request for data in response to a request failing in the source broadcast protocol.

23. A computer system comprising:
a first processor operative to issue a source broadcast request for data, the first processor including an associated conflict state machine for managing non-data responses to the source broadcast request for the data;
a second processor operative to issue a source broadcast request for the data; and
a third processor operative to provide a data response to both the first and second processors in response to the source broadcast requests of the first and second processors;

the second processor in response to the source broadcast request of the first processor providing a read conflict response when the source broadcast request of the second processor is a source broadcast read request, the second processor in response to the source broadcast request of the first processor providing a second conflict response when the source broadcast request of the second processor is a source broadcast write request;

the conflict state machine transitioning to a first conflict state of a plurality of conflict states if the first processor receives the read conflict response, the conflict state machine transitioning to a second conflict state of the plurality of conflict states if the first processor receives the second conflict response having a priority higher than the priority of the first conflict response; and the first processor being operative to fill the data provided by the third processor in a cache associated with the first processor if the conflict state machine transitions to the first conflict state in response to the first processor receiving the read conflict response; and a hybrid cache coherency protocol including a broadcast source snoop protocol implemented in conjunction with a forward progress protocol, wherein each of the first and second processors employs the broadcast source snoop protocol to issue the source broadcast request for the data and provide responses for the data, and wherein if the source broadcast request fails in the broadcast source snoop protocol, the hybrid cache coherency protocol transitions to the forward progress protocol and each of the first and second processors reissues a request for the data using the forward progress protocol;

the broadcast request provided by the first node is broadcast using a source broadcast cache coherency protocol, the source broadcast cache coherency protocol being chosen by the first node based on the state of the conflict state machine.

24. The computer system of claim 23, wherein the first processor is, operative to reissue the source broadcast request from the first processor by issuing a request for the data employing a forward progress protocol if the conflict state machine transitions to the second conflict state in response to the first processor receiving the second conflict response.

25. The computer system of claim 23, wherein the first processor is prevented from filling the data provided by the third processor in the cache associated with the first processor if the conflict state machine transitions to the second conflict state in response to the first processor receiving the second conflict response.

26. The computer system of claim 23, wherein the third processor provides a shared data response to the first processor in response to the source broadcast request for the data, the first processor being operative to place the shared data in the cache associated with the first processor and associate an invalid state with the data in the cache associated with the first processor.

27. The computer system of claim 23, wherein the computer system implements hybrid cache coherency protocol in which each of the first, second, and third processor employs a source broadcast based protocol to issue requests for data and provide responses to requests, and employs an associated protocol employing a forward progress technique to reissue a request for data in response to a request failing in the source broadcast protocol.

28. A system comprising:

means for providing a broadcast request for data from a first node that defines a first processor node using a first cache coherency protocol, the means for providing the broadcast request including means for managing, non-data responses to the broadcast request and for transitioning among a plurality of conflict states in response to the non-data responses, wherein the first cache coherency protocol is a broadcast source snoop protocol of a hybrid cache coherency protocol, and wherein broadcast source snoop protocol is implemented in conjunction with a forward progress protocol of the hybrid cache protocol;

means for providing a read conflict response from a second node that, defines a second processing node to the broadcast request from the first node when the second node has a pending broadcast read request for the data, wherein the means for managing non-data responses transitions to a conflict state of the plurality of conflict states according to a highest priority non-data response received by the means for providing the broadcast request;

wherein each of the first and second processors employs the broadcast source snoop protocol to issue a snoop request for the data and provide responses for the data;

means for providing the data from a third node to the first node in response to the broadcast request from the first node; and means for placing the data from the third node in a cache associated with the first node in response to the read conflict response from the second node causing the means for managing non-data responses to transition to the conflict state; and if the broadcast request fails in the broadcast source snoop protocol, means for transitioning to the forward progress protocol, wherein each of the first and second processors reissues a request for the data using the forward progress protocol;

the broadcast request provided by the first node is broadcast using a source broadcast cache coherency protocol, the source broadcast cache coherency protocol being chosen by the first node based on the state of the conflict state machine.

29. The system of claim 28, wherein the means for providing a broadcast request from the first node comprises means for providing a broadcast read request for the data from the first node, the system further comprising:

means for providing a read conflict response, from the first node to the second node in response to the broadcast read request of the second node, the read conflict response from the first node indicating that the pending broadcast read request of the second node conflicts with the broadcast read request for the data from the first node;

means for providing the requested data to the second node from the third node in response to the broadcast read request of the second node; and means for filling the data provided to the second node by the third node in a cache associated with the second node in response to the second node receiving the read conflict response from the first node.

30. The system of claim 28, wherein the means providing a broadcast request from the first node comprises means for providing a broadcast write request for the data from the first node, the system further comprising:

means for providing a second conflict response from the first node to the second node in response to the, pending broadcast read request of the second node, the second conflict response from the first node indicating that the pending broadcast read request of the second node conflicts with the broadcast write request for the data from the first node; and means for reissuing the broadcast read request of the second node employing a forward progress protocol in response to the second conflict response provided by the first node.

31. The system of claim 30, further comprising means for preventing the second node from placing the data provided by the third node in a cache associated with the second node in response to the second conflict response provided by the first node.

32. The system of claim 28, wherein the means for providing the data from the third node to the first node is operative to provide shared data to the means for providing a broadcast request, the means for placing the data provided by the third node placing the shared data in the cache associated with the first node, the system further comprising means for associating an invalid state with the data in the cache associated with the first processor.

33. A method comprising:
    providing a source broadcast request from a first node for data using a broadcast source snoop protocol of a hybrid cache coherency protocol, broadcast source snoop protocol being implemented in conjunction with a forward progress protocol of the hybrid cache protocol, the first node defining a first processor;
    providing a read conflict response to the first node from a second node in response to the source broadcast request from the first node, the read conflict response indicating that the second node has a pending broadcast read request for the data, the second node defining a second processor;
    wherein each of the first and second processors employs the broadcast source snoop protocol to issue a snoop request for the data and provide responses for the data;
    transitioning a state of a conflict state machine, which is part of the first node based on the read conflict response being a highest priority non-data response that is received by the first node;
    providing the requested data to the first node from a third node in response to the source broadcast request from the first node;
    placing the data provided by the third node in a cache associated with the first node based on the state of the conflict state machine; and
    if the broadcast request fails in the broadcast source snoop protocol, transitioning to the forward progress protocol, wherein the first processor reissues a request for the data using the forward progress protocol;
    the broadcast request provided by the first node is broadcast using a source broadcast cache coherency protocol, the source broadcast cache coherency protocol being chosen by the first node based on the state of the conflict state machine.

34. The method of claim 33, wherein providing a source broadcast request from the first node comprises providing a source broadcast read request from the first node, the method further comprising:
    providing a read conflict response from the first node to the second node in response to the pending broadcast read request of the second node, the read conflict response from the first node indicating that the pending broadcast read request of the second node conflicts with the source broadcast read request provided by the first node;
    providing the requested data to the second node from the third node in response to the pending broadcast read request of the second node; and
    placing the data provided to the second node by the third node in a cache associated with the second node.

35. The method of claim 33, wherein providing a broadcast request from the first node comprises providing a broadcast write request from the first node, the method further comprising:
    providing a second conflict response from the first node to the second node in response to the pending broadcast read request of the second node the second conflict response from the first node indicating that the pending broadcast read request of the second node conflicts with the broadcast write request provided by the first node; and
    preventing placement of the data in a cache associated with the second node in response to the second conflict response provided by the first node.

36. The method of claim 35, further comprising reissuing the source broadcast read request of the second node as a forward progress protocol read request for the data from the second node in response to the second conflict response provided by the first node.

* * * * *

UNITED STATES PATENT AND TRADEMARK OFFICE
CERTIFICATE OF CORRECTION

PATENT NO. : 7,620,696 B2
APPLICATION NO. : 10/761047
DATED : November 17, 2009
INVENTOR(S) : Stephen R. Van Doren et al.

It is certified that error appears in the above-identified patent and that said Letters Patent is hereby corrected as shown below:

In column 30, line 34, in Claim 9, delete "first," and insert -- first --, therefor.

In column 30, line 41, in Claim 11, delete "one," and insert -- one --, therefor.

In column 30, line 45, in Claim 12, delete "lag" and insert -- tag --, therefor.

In column 30, line 46, in Claim 12, delete "state'" and insert -- state --, therefor.

In column 30, line 52, in Claim 13, delete "associated," and insert -- associated --, therefor.

In column 30, line 59, in Claim 13, delete "processor the," and insert -- processor, the --, therefor.

In column 30, line 59, in Claim 13, delete "being," and insert -- being --, therefor.

In column 31, line 1, in Claim 14, delete "second" and insert -- second, --, therefor.

In column 31, lines 1-2, in Claim 14, delete "broadcast based" and insert -- broadcast-based --, therefor.

In column 31, line 62, in Claim 17, delete "multi-processor," and insert -- multi-processor --, therefor.

In column 32, line 17, in Claim 21, delete "the," and insert -- the --, therefor.

In column 32, line 33, in Claim 21, delete "data," and insert -- data --, therefor.

In column 32, line 34, in Claim 21, delete "processor" and insert -- processor, --, therefor.

In column 32, lines 50-51, in Claim 22, delete "broadcast based" and insert -- broadcast-based --, therefor.

In column 33, line 15, in Claim 23, after "response;" delete "and".

In column 33, line 38, in Claim 24, delete "is," and insert -- is --, therefor.

In column 33, line 59, in Claim 27, delete "broadcast based" and insert -- broadcast-based --, therefor.

In column 34, line 24, in Claim 28, after "node;" delete "and".

CERTIFICATE OF CORRECTION (continued)
U.S. Pat. No. 7,620,696 B2

In column 34, line 44, in Claim 29, delete "response," and insert -- response --, therefor.

In column 34, line 62, in Claim 30, delete "the," and insert -- the --, therefor.

In column 36, line 31, in Claim 35, delete "node" and insert -- node, --, therefor.

Signed and Sealed this

Sixteenth Day of February, 2010

David J. Kappos
*Director of the United States Patent and Trademark Office*